(12) United States Patent
Atallah et al.

(10) Patent No.: US 12,067,368 B1
(45) Date of Patent: Aug. 20, 2024

(54) USING SEMANTIC MODELS DETERMINED BASED ON DATA SOURCE AND CONTEXT IN A NATURAL LANGUAGE INTERFACE FOR VISUAL DATA ANALYSIS

(71) Applicant: Tableau Software, LLC, Seattle, WA (US)

(72) Inventors: Ryan Andrew Atallah, Palo Alto, CA (US); Jared Briskman, Redwood City, CA (US); Ruhaab Shay Markas, San Jose, CA (US)

(73) Assignee: Tableau Software, LLC, Seattle, WA (US)

( * ) Notice: Subject to any disclaimer, the term of this patent is extended or adjusted under 35 U.S.C. 154(b) by 259 days.

(21) Appl. No.: 17/368,828

(22) Filed: Jul. 7, 2021

(51) Int. Cl.
| | |
|---|---|
| *G06F 16/903* | (2019.01) |
| *G06F 3/0481* | (2022.01) |
| *G06F 16/33* | (2019.01) |
| *G06F 16/338* | (2019.01) |
| *G06F 40/247* | (2020.01) |
| *G06F 40/279* | (2020.01) |
| *G06F 40/40* | (2020.01) |

(52) U.S. Cl.
CPC .......... *G06F 40/40* (2020.01); *G06F 3/0481* (2013.01); *G06F 16/3332* (2019.01); *G06F 16/3344* (2019.01); *G06F 16/338* (2019.01); *G06F 16/90335* (2019.01); *G06F 40/247* (2020.01); *G06F 40/279* (2020.01)

(58) Field of Classification Search
CPC .......... G06F 16/3332; G06F 16/90335; G06F 16/3344; G06F 16/338
See application file for complete search history.

(56) References Cited

U.S. PATENT DOCUMENTS

| | | | | |
|---|---|---|---|---|
| 8,907,886 | B2 * | 12/2014 | Robbins | ............... G06F 3/0485 345/173 |
| 11,500,865 | B1 * | 11/2022 | Wang | .................... G06F 16/243 |
| 2006/0100985 | A1 * | 5/2006 | Mark | ..................... G06Q 10/02 |
| 2007/0118527 | A1 * | 5/2007 | Winje | ................. G06F 21/6218 707/999.009 |
| 2008/0104013 | A1 * | 5/2008 | Saus | ................. G06F 16/24534 |
| 2018/0144065 | A1 * | 5/2018 | Yellai | ............... G06F 16/90332 |
| 2020/0145310 | A1 * | 5/2020 | Lodhia | .................. H04L 67/568 |
| 2021/0297377 | A1 * | 9/2021 | Bastide | ................ G06F 40/279 |

* cited by examiner

*Primary Examiner* — Vaishali Shah
(74) *Attorney, Agent, or Firm* — Morgan, Lewis & Bockius LLP

(57) ABSTRACT

A computing device receives user selection of a data source and a lens that specifies supplemental metadata for the data source. The device receives user input to specify a natural language command directed to the data source. In response to the user input, the device determines one or more data fields and/or data values from the data source for interpreting the natural language command in accordance with the metadata from the lens. The device translates the natural language command into one or more executable database queries referencing data fields and/or data values specified in the natural language command. The device executes the one or more database queries to retrieve data from the data source. The device also generates and displays a data visualization using the retrieved data.

18 Claims, 38 Drawing Sheets

USING SEMANTIC MODELS DETERMINED BASED ON DATA SOURCE AND CONTEXT IN A NATURAL LANGUAGE INTERFACE FOR VISUAL DATA ANALYSIS

RELATED APPLICATIONS

This application is related to the following applications, each of which is incorporated by reference herein in its entirety:

(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;

(ii) U.S. patent application Ser. No. 15/804,991, filed Nov. 6, 2017, entitled "Systems and Methods of Using Natural Language Processing for Visual Analysis of a Data Set," now U.S. Pat. No. 10,817,527;

(iii) U.S. patent application Ser. No. 15/978,062, filed May 11, 2018, entitled "Applying Natural Language Pragmatics in a Data Visualization User Interface," now U.S. Pat. No. 10,795,902;

(iv) U.S. patent application Ser. No. 15/978,066, filed May 11, 2018, entitled "Data Visualization User Interface Using Cohesion of Sequential Natural Language Commands," now U.S. Pat. No. 11,010,396;

(v) U.S. patent application Ser. No. 15/978,067, filed May 11, 2018, entitled "Updating Displayed Data Visualizations According to Identified Conversation Centers in Natural Language Commands," now U.S. Pat. No. 11,030,207;

(vi) U.S. patent application Ser. No. 16/219,406, filed Dec. 13, 2018, entitled "Identifying Intent in Visual Analytical Conversations," now U.S. Pat. No. 10,896,297;

(vii) U.S. patent application Ser. No. 16/134,892, filed Sep. 18, 2018, entitled "Analyzing Natural Language Expressions in a Data Visualization User Interface," now U.S. Pat. No. 11,048,871;

(viii) U.S. patent application Ser. No. 16/134,907, filed Sep. 18, 2018, entitled "Natural Language Interface for Building Data Visualizations, Including Cascading Edits to Filter Expressions," now U.S. Pat. No. 10,902,045;

(ix) U.S. patent application Ser. No. 16/166,125, filed Oct. 21, 2018, entitled "Determining Levels of Detail for Data Visualizations Using Natural Language Constructs," now U.S. Pat. No. 11,055,489;

(x) U.S. patent application Ser. No. 16/234,470, filed Dec. 27, 2018, entitled "Analyzing Underspecified Natural Language Utterances in a Data Visualization User Interface";

(xi) U.S. patent application Ser. No. 16/601,437, filed Oct. 14, 2019, entitled "Incremental Updates to Natural Language Expressions in a Data Visualization User Interface";

(xii) U.S. patent application Ser. No. 16/680,431, filed Nov. 11, 2019, entitled "Using Refinement Widgets for Data Fields Referenced by Natural Language Expressions in a Data Visualization User Interface";

(xiii) U.S. patent application Ser. No. 14/801,750, filed Jul. 16, 2015, entitled "Systems and Methods for using Multiple Aggregation Levels in a Single Data Visualization";

(xiv) U.S. patent application Ser. No. 17/026,113, filed Sep. 18, 2020, entitled "Using Dynamic Entity Search during Entry of Natural Language Commands for Visual Data Analysis";

(xv) U.S. patent application Ser. No. 17/063,663, filed Oct. 5, 2020, entitled "Visually Correlating Individual Terms in Natural Language Input to Respective Structured Phrases Representing the Natural Language Input";

(xvi) U.S. patent application Ser. No. 15/911,026, filed Mar. 2, 2018, titled "Using an Object Model of Heterogeneous Data to Facilitate Building Data Visualizations"; and (xvii) U.S. patent application Ser. No. 16/236,612, filed Dec. 30, 2018, titled "Generating Data Visualizations According to an Object Model of Selected Data Sources," each of which is incorporated by reference herein in its entirety.

TECHNICAL FIELD

The disclosed implementations relate generally to data visualization and more specifically to systems, methods, and user interfaces that enable users to interact with data visualizations and analyze data using natural language expressions.

BACKGROUND

Visual analytics (e.g., data visualization) applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

The use of natural language expressions to generate data visualizations provides a user with greater accessibility to data visualization features, including updating the fields and changing how the data is filtered. A natural language interface enables a user to develop valuable data visualizations with little or no training.

SUMMARY

Natural language interfaces are becoming a useful modality for data exploration. However, supporting natural language interactions with visual analytical systems for specific use cases is often challenging. For example, different business groups within an organization may be interested in exploring different data fields within the data sources. They may also refer to the same data fields and/or date values differently. To illustrate, the marketing team may refer to its customers as "consumers" whereas the retail team may refer to the same group of customers as "purchasers."

Accordingly, there is a need for improved systems and methods that support and refine natural language interactions with visual analytical systems. The present disclosure describes data visualization platforms that improve the effectiveness of natural language interfaces by resolving natural language utterances according to specific business use cases, by curating data specific to each of the use cases.

Data curation is an important prerequisite underlying a user's interaction with a visual analytics system. Visual analytics tools use metadata such as field synonyms, value synonyms, and custom suggested questions to improve user experiences. Existing systems generally only permit data source owners or administrators to edit metadata underlying the data sources and/or curate content. However, the owners and/or administrators may not know which data in the underlying data sources are of interest to specific business groups.

The present disclosure describes generation and application of "lenses" to improve the effectiveness of natural language interfaces. In contrast to existing systems, which limit data curation to data source owners, the author of a "lens" in the present disclosure is one who understands the data, the business use case, and the needs of the business user (e.g., preferences and terminology). The author creates a lens by selecting a subset of data fields from one or more data sources (e.g., hiding unnecessary fields). The author also specifies (e.g., curates) supplemental metadata, including synonyms for the selected subset of data fields, synonyms for data values for the data fields, and/or suggested questions about the data values and/or data fields. Thus, the lens customizes the visual analytics experience specific to a business use case.

In some implementations of the present disclosure, the lens introduces an additional layer between a published data source and a natural language processing system. User curated metadata (e.g., synonyms and specific questions) is indexed at the lens level. Stated another way, the lenses that are generated do not disturb the underlying data source. With lenses, different user groups using the same data sources for data analytics can reuse metadata from the data sources for multiple experiences, each of which is tailored to specific business use cases.

Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at a computing device. The computing device has a display, one or more processors, and memory. The memory stores one or more programs configured for execution by the one or more processors. The computing device receives user selection of a data source and a lens that specifies supplemental metadata for the data source. The supplemental metadata specified by the lens includes one or more of: synonyms for a subset of data fields from the data source; synonyms for data values of data fields from the data source; and suggested questions about data values and/or data fields from the data source. The computing device receives user input to specify a natural language command directed to the data source. In response to the user input, the computing device determines one or more data fields and/or data values from the data source for interpreting the natural language command in accordance with the metadata from the lens. The computing device translates the natural language command into one or more executable database queries referencing data fields and/or data values specified in the natural language command. The computing device executes the one or more database queries to retrieve data from the data source. The computing device generates and displays a data visualization using the retrieved data.

In some implementations, translating the natural language command into one or more executable database queries further comprises: resolving one or more terms in the natural language command using an index of the lens; and translating the resolved terms into one or more corresponding data fields and/or data values of the data source.

In some implementations, the one or more database queries are executed using an index maintained and collocated at the data source.

In some implementations, the supplemental metadata specified by the lens further includes one or more of: filters; synonyms of analytical expressions; descriptions of data fields; and descriptions of data values.

In some implementations, receiving the user input to specify the natural language command includes receiving partial user input of a text string. In response to receiving the partial input of a text string, the computing device displays a response that is limited to a subset of data fields that is specified in the lens.

In some implementations, the lens is stored in a server system, distinct from the computing system.

In some implementations, the lens is stored on the computing device.

In some implementations, the lens includes an identifier, an owner, and permissions governing user access.

In some implementations, the user selection of the data source and the lens comprises, in response to user selection of the data source, determining a user group to which the user belongs. The computing device determines one or more lenses that are available to the user based on the user group. The computing device displays respective identifications of the one or more lenses. The computing device receives user selection of one of the lenses.

In some implementations, the user selection of the data source and the lens comprises: in response to receiving the user selection of the data source, identifying a user group to which the user belongs. The computing device automatically selects the lens based on the user group.

In accordance with some implementations, a method for generating lenses for visual analysis is performed at a computing device. The computing device includes a display, one or more processors, and memory. The memory stores one or more programs configured for execution by the one or more processors. The computing device receives user selection of one or more data sources in a graphical user interface. The computing device receives user selection of a predefined subset of data fields. The computing device receives user specification of one or more of: a first synonym for a data field in the predefined subset of data fields; a second synonym for a data value of a data field in the predefined subset of data fields; and one or more suggested questions related to the predefined subset of data fields. The computing device curates data related to the predefined subset of data fields according to the user specification. The computing device constructs a first lens according to the curated data. The computing device causes an identification of the first lens to be displayed at the computing device.

In accordance with some implementations, a computing device includes one or more processors, memory, and one or more programs stored in the memory. The programs are configured for execution by the one or more processors. The one or more programs include instructions for performing any of the methods described herein.

In accordance with some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by using metadata from a lens of a data source to interpret a user-specified natural language command directed to the data source. The data visualization application translates the natural language command into one or more executable database queries referencing data fields and/or data values specified in the natural language command. The data visualization application executes the one or more database queries to retrieve data from the data source, and generates and displays a data visualization using the retrieved data. Such methods and devices improve user interaction with the natural language interface by tailoring the user experience specific to a business use case. A lens comprises supplemental metadata for the data source, which is specified by a user (e.g., the author). The supplemental metadata specified by the lens includes one or more of: synonyms for a subset of data fields from the data source; synonyms for data values for data fields from the data source; and suggested questions about data values and/or data fields from the data source. In some implementations, a lens comprises supplemental metadata for filters, synonyms of analytical expressions, descriptions of data fields, and/or descriptions of data values.

Figure 1A:
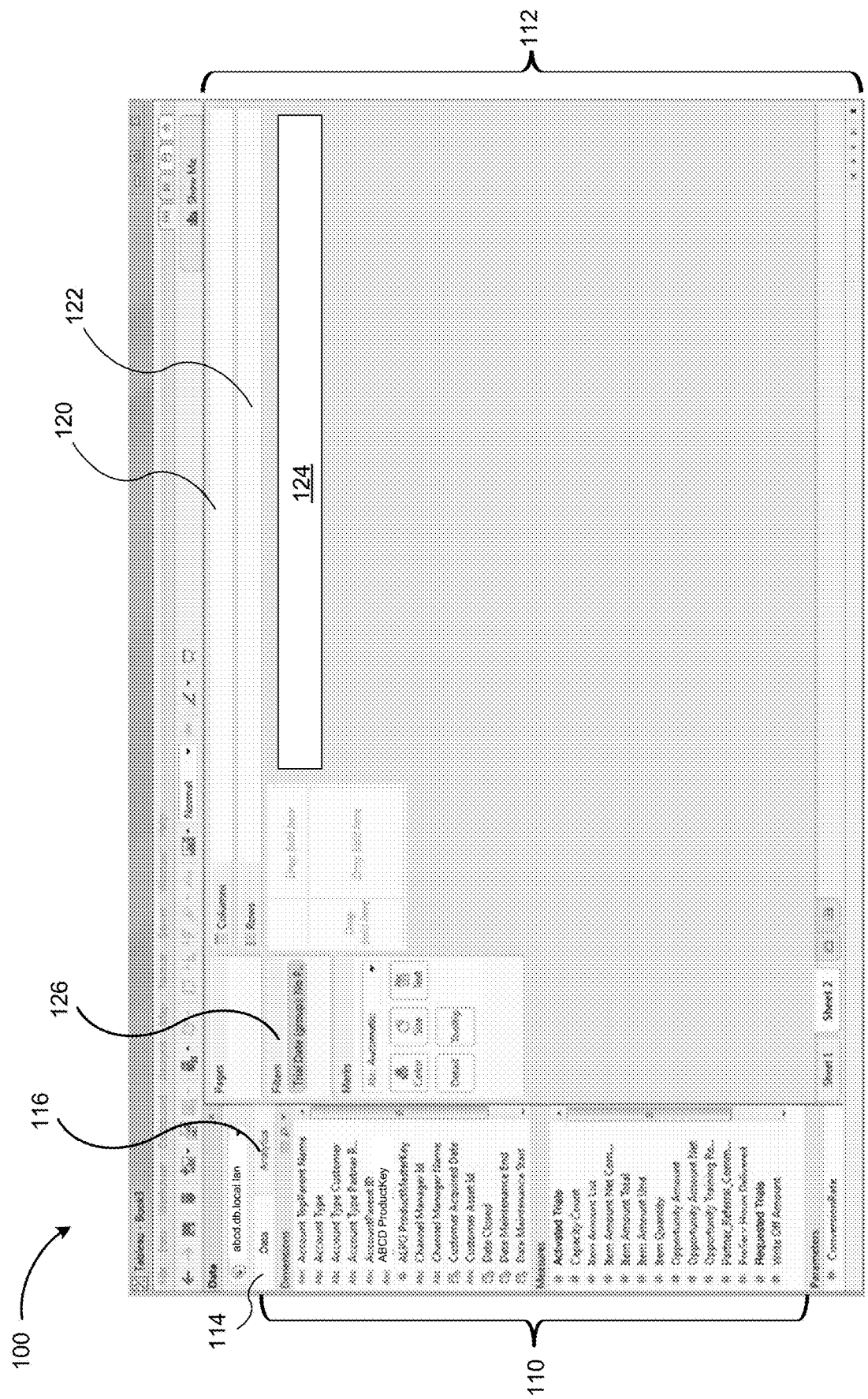
FIGS. 1A and 1B illustrate a graphical user interface according to some implementations.

FIG. 1A shows a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 1B:
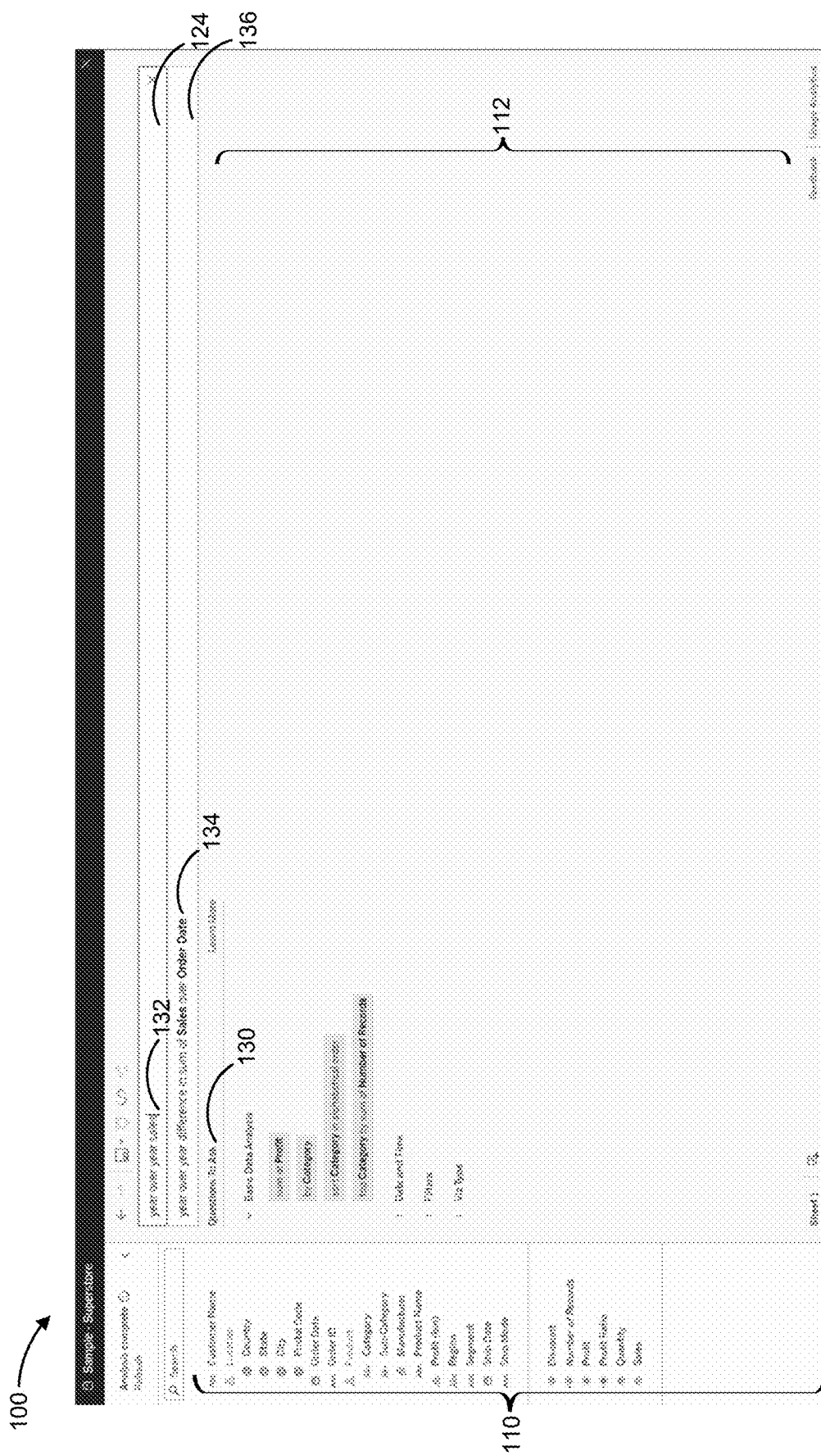

FIG. 1B illustrates a graphical user interface 100 according to some implementations. In some implementations, as illustrated in FIG. 1B, the data visualization region 112 displays suggestions 130 (e.g., tips or pointers) to assist the user in interacting with the data source. Further details about the suggestions 130 are described in U.S. patent application Ser. No. 16/601,437, filed Oct. 14, 2019, entitled "Incremental Updates to Natural Language Expressions in a Data Visualization User Interface," which is incorporated by reference herein in its entirety.

In the example of FIG. 1B, a user is interacting with a data source 258. The schema information region 110 provides named data elements (e.g., field names) from the data source 258, which may be selected and used to build a data visualization.

FIG. 1B also illustrates user interaction with the graphical user interface 100. In this example, the user inputs (e.g., enters or types) a natural language expression (e.g., a natural language command) 132 "year over year sales" in the command box 124. The user may also input the natural language expression by speech, which is then captured using an audio input device 220 (e.g. a microphone) coupled to the computing device 200. Typically, the natural language expression includes one or more terms that identify data fields from the data source 258. A term may be a dimension (e.g., categorical data) or a measure (e.g., a numerical quantity). As illustrated by the example, the natural language input typically includes one or more terms that correspond to database fields (e.g., the term "sales" identifies a data field from the data source).

In some implementations, parsing of the natural language expression is triggered in response to the user input. In this example, the natural language command 132 includes the terms "year over year," which specifies a table calculation type.

In response to the natural language command 132, the graphical user interface 100 displays an interpretation 134 (e.g., also referred to as a proposed action) in an interpretation box 136. In some implementations, as illustrated in FIG. 1B, the field names "Sales" and "Order Date" are displayed in a visually distinctive manner (e.g., in boldface) relative to other words included in the interpretation 134.

Figure 2A:
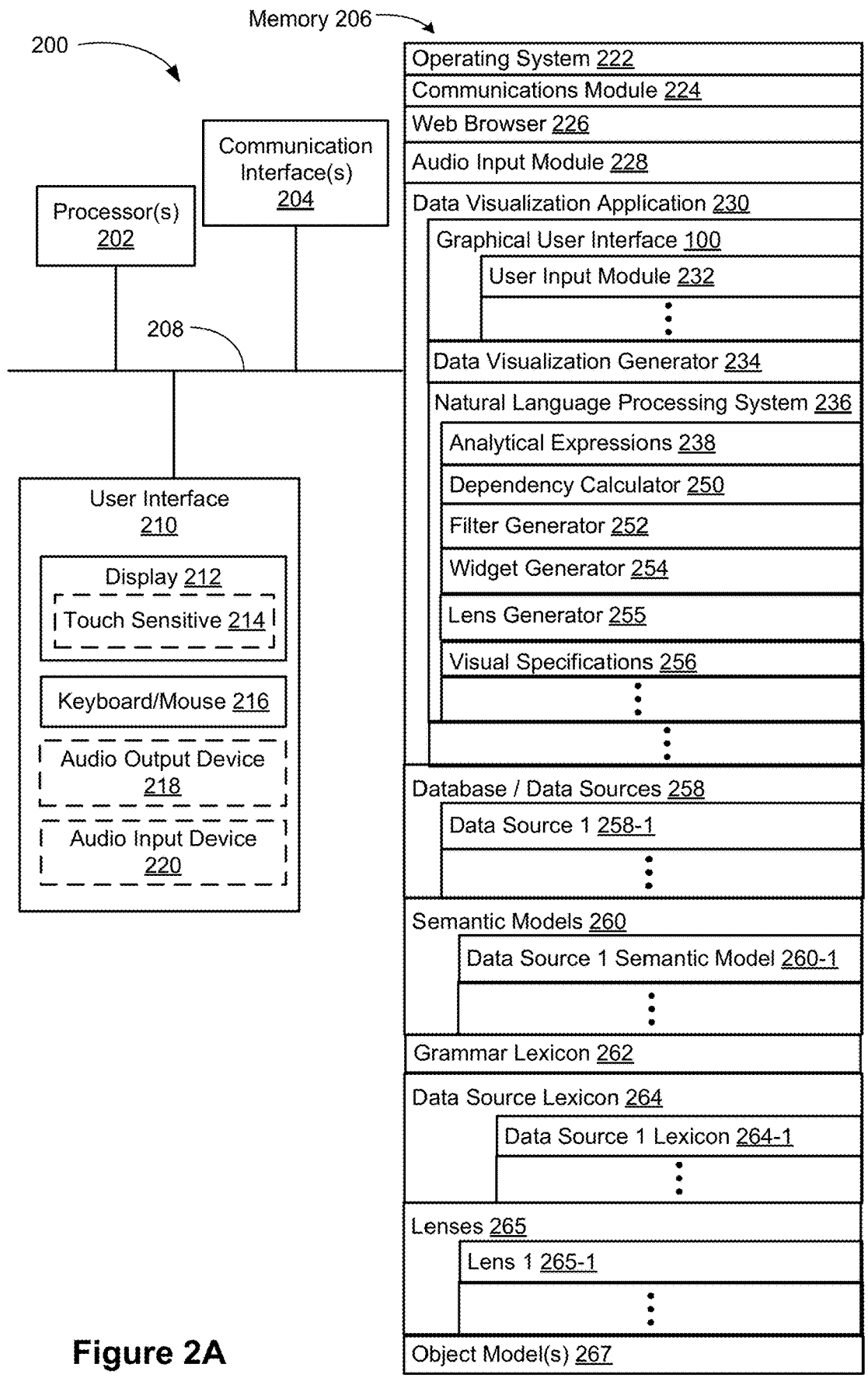
FIGS. 2A-2D are block diagrams of a computing device according to some implementations.

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language system 236);
- a data visualization application 230 (e.g., a visual analytics application), which generates data visualizations and related features. In some implementations, the data visualization application 230 includes:
    - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data sources. In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
    - a data visualization generator 234, which automatically generates and displays a corresponding visual graphic (also referred to as a "data visualization" or a "data viz") using the user input (e.g., the natural language input);

a natural language system 236, which receives and parses the natural language input provided by the user. The natural language system 236 may identify analytical expressions 238, which are described in FIG. 2B.

the natural language system 236 may also include a dependency calculator 250, which looks up dependencies in a database 258 to determine how particular terms and/or phrases are related (e.g., dependent);

in some implementations, the natural language system 236 includes a filter generator 252, which determines if one or more filters are related to a field that has been modified by a user. The filter generator 252 generates the one or more filters based on user selections;

a widget generator 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field;

a lens generator 255, which generates one or more lenses 265; and visual specifications 256, which are used to define characteristics of a desired data visualization. In some implementations, the information the user provides (e.g., user input) is stored as a visual specification. In some implementations, the visual specifications 256 include previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data sources, and uses the selected fields to define a visual graphic;

zero or more semantic models 260 (e.g., a first semantic model 260-1), each of which is derived directly from a respective database or data source 258. The semantic model 260 represents the database schema and contains metadata about attributes (e.g., data fields). In some implementations, the semantic model 260 also includes metadata of alternative labels or synonyms of the attributes. The semantic model 260 includes data types (e.g., "text," "date," "geospatial," "Boolean," and "numeric"), attributes (e.g., a currency type, such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon 262, which contains a set of analytical concepts 266 found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values;

a grammar lexicon 262, which includes analytical concepts 266 (see FIG. 2C) that are used to support the analytical expressions 238 for forming intermediate expressions;

zero or more data source lexicons 264 (e.g., a first data source lexicon 264-1), each of which is associated with a respective database or data source 258. Details of the components of a data source lexicon are described in FIG. 2D;

zero or more lenses 265 (e.g., a first lens 265-1), each of which is associated with one or more respective databases or data sources 258. A lens 265 includes a subset of data fields of the one or more data sources 258. A lens 265 includes supplemental metadata (e.g., specified or curated by an author of the lens), such as synonyms for a subset of data fields, synonyms for data values of data fields from the data sources 258, and/or suggested questions about data values and/or data fields from the data sources 258. In some implementations, the supplemental metadata specified by the lens also includes: filters, synonyms of analytical expressions (e.g., synonyms for analytical expressions such as filters, groupings, or aggregations), descriptions of data fields, and/or descriptions of data values. In some implementations, a lens 265 includes an identifier, an owner, and permissions governing user access; and zero or more object models 267, which identify the structure of the data sources 258. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes. Further information about object models can be found in U.S. patent application Ser. No. 15/911,026, filed Mar. 2, 2018, titled "Using an Object Model of Heterogeneous Data to Facilitate Building Data Visualizations," and U.S. patent application Ser. No. 16/236,612, filed Dec. 30, 2018, titled "Generating Data Visualizations According to an Object Model of Selected Data Sources," each of which is incorporated by reference herein in its entirety.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language system 236) to address the problem of proliferation of ambiguous syntactic parses inherent to natural language querying. The canonical structures are unambiguous from the point of view of the parser and the natural language system 236 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
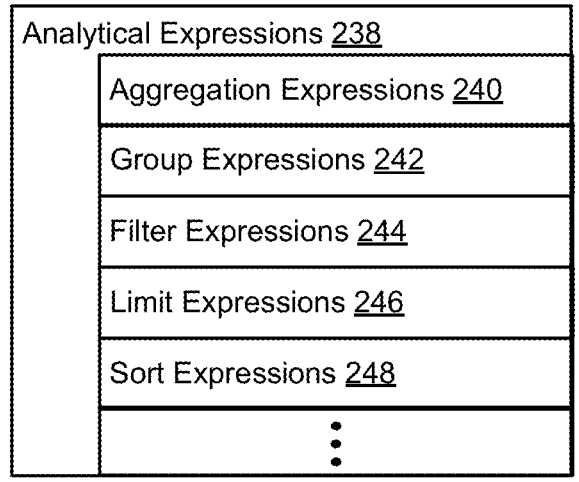

FIG. 2B is block diagram illustrating the analytical expressions 238 of the natural language system 236, in accordance with some implementations. The analytical expressions 238 include:
- aggregation expressions 240. For example, "average Sales" is an aggregate expression that includes an aggregate term "average" and an attribute "Sales." In some implementations, the aggregation expressions 240 are in the canonical form [agg att], where agg∈Aggregations and att is an Attribute (i.e., a data field);
- group expressions 242. For example, "by Region" is a group expression that includes a group term "by" and an attribute "Region." In some implementations, the group expressions 242 are in the canonical form [grp att], where grp∈Groups and att is an attribute;
- filter expressions 244. For example, "Customer Name starts with John" is a filter expression that contains an attribute "Customer Name," a filter "starts with," and a value "John." In some implementations, the filter expressions 244 are in the canonical form [att filter val], where att is an attribute, filter∈Filters, and val∈Values;
- limit expressions 246. For example, "top 5 Wineries by sum of Sales" is a limit expression that contains a limit term "top", a value "5", a group by attribute "Wineries," and an aggregation expression "sum of Sales." In some implementations, the limit expressions 246 are in the canonical form [limit val ge ae], where limit∈Limits, val∈Values, ge∈group expressions, and ae∈aggregation expressions; and
- sort expressions 248. For example, in "sort Products in ascending order by sum of Profit," the phrase "ascending order" is the sort term, "Products" is the attribute to group by, and "sum of Profit" is the aggregation expression. In some implementations, the sort expressions 248 are in the canonical form [sort ge ae], where sort∈Sorts, ge∈group expressions, and ae∈aggregation expressions.

Figure 2C:
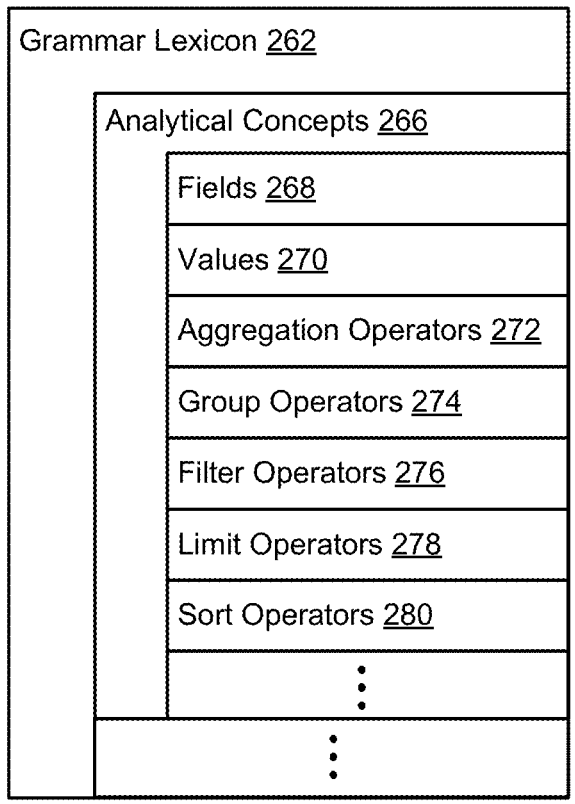

FIG. 2C is a block diagram illustrating components of a grammar lexicon 262 according to some implementations. In some implementations, the grammar lexicon comprises analytical concepts 266 that support the formation of analytical expressions 238. The analytical concepts 266 include:
- data fields 268, which are database fields. Examples of field concepts include "Sales," and "Product Category";
- data values 270, which are data values for database fields. Examples of value concepts include the value 10,500,000.00 for a Sales data field and the value "Chairs" for a Product Category data field;
- aggregation operators 272, which are operators that aggregate the values of multiple rows to form a single value based on a mathematical operation. Examples of aggregation concepts include "sum," "average," "median," "count," and "distinct count";
- group operators 274, which are operators that partition the data into categories. An example of a group concept is the "by" key value;
- filter operators 276, which are operators that return a subset of rows from the database. Examples of filter concepts include "filter to," "at least," "between," and "at most";
- limit operators 278, which are operators (akin to the filters 276) that return a subset of rows from the database, restricting to n rows, where 1≤n≤N, and N is the total number of rows in the domain. Examples of limit concepts include "top" and "bottom"; and
- sort operators 280, which are operators that arrange data rows in a specific order. Examples of sort concepts include "ascending," "descending," and "alphabetical."

Figure 2D:
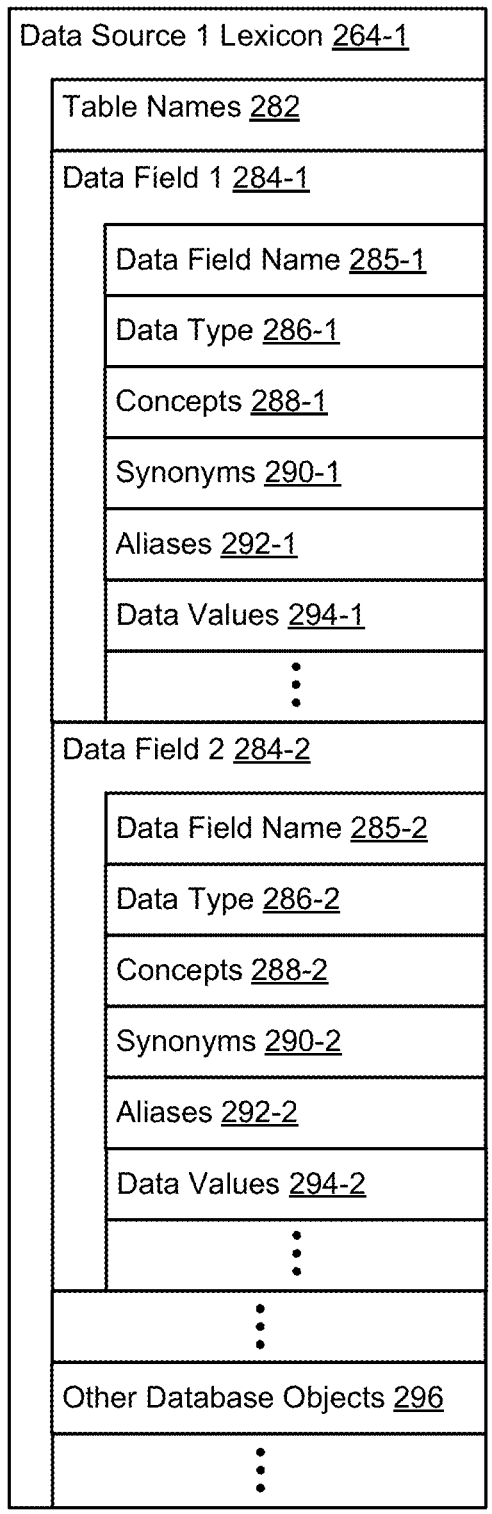

FIG. 2D is a block diagram illustrating components of a first data source lexicon 264-1, in accordance with some implementations. The first data source lexicon 264-1 includes table names 282 corresponding to names of one or more tables of the first data source 258-1, a plurality of data fields 284 (e.g., the data fields 284-1 and 284-2) of the first data source 258-1, and other database objects 296. Each data field 284 includes:
- a data field name 285, which identifies the data field;
- a data type 286, such as integer, string, date, or floating point numeric;
- one or more concepts 288, which are used to interpret the data field. For example, a data value "Michael" may be interpreted using the concepts such as a "string," "name," "gender (e.g., male)," "singer," "basketball player," and/or "chef." In some implementations, the one or more concepts are derived from elastic searches;
- zero or more synonyms 290, which are defined by the system. For example, a data field "average" may include synonyms such as "mean" and "avg";
- zero or more aliases 292, which are defined by the user. For example, a data field "goods" may include aliases such as "widgets," "bananas," and "my favorite field"; and
- data values 294, which are some or all of the distinct values for a data field. This is particularly useful for low cardinality string data fields. In some instances, the set of stored data values 294 for a data field 284 in a lexicon 264 is limited to data values with threshold usage in the data field 284 (e.g., include a data value 294 in the lexicon when the data value appears in at least a threshold number of rows for the data field 284 or appears in a threshold percentage of the rows of the data field).

In some implementations, a data source lexicon 264 includes other database objects 296 as well.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Figure 3:
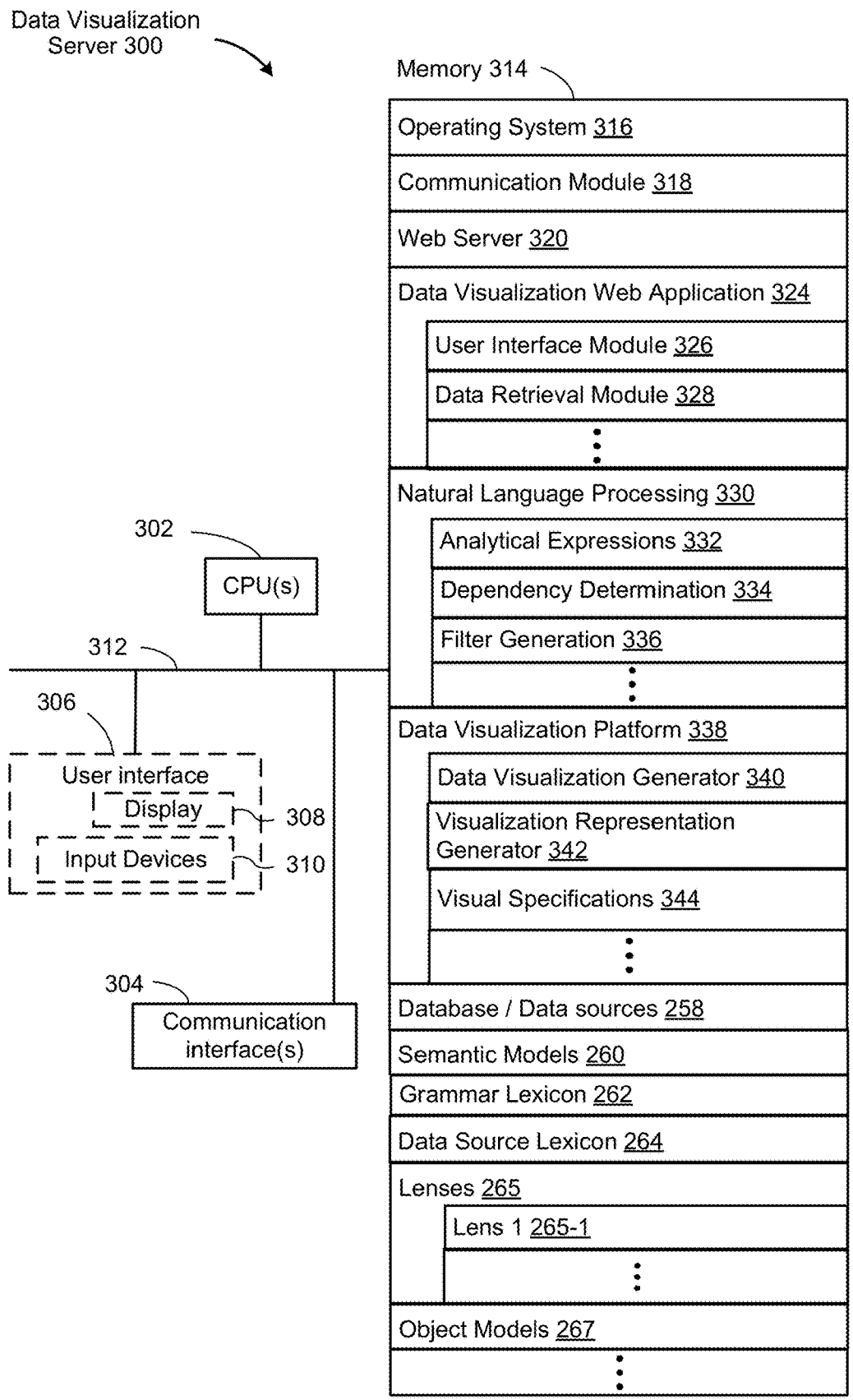
FIG. 3 illustrates a block diagram of a data visualization server according to some implementations.

FIG. 3 is a block diagram illustrating an example server system 300 in accordance with some implementations. In some implementations, the server system 300 is a data visualization server. In some implementations, the server system 300 hosts one or one or more databases/data sources 258 and/or metadata corresponding to the data sources. In some implementations, the server system 300 provides various executable applications or modules. The server system 300 typically includes one or more processing units/cores (CPUs) 302, one or more communication network interfaces 304, memory 314, and one or more communication buses 312 for interconnecting these components. In some implementations, the server system 300 includes a user interface 306, which includes a display device 308 and one or more input devices 310, such as a keyboard and a mouse. In some implementations, the communication buses 312 includes circuitry (sometimes called a chipset) that interconnects and controls communications between system components In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprises a non-transitory computer readable storage medium.

In some implementations, the memory 314 or the computer readable storage medium of the memory 314 stores the following programs, modules, and data structures, or a subset thereof:

- an operating system 316, which includes procedures for handling various basic system services and for performing hardware dependent tasks;
- a network communication module 318, which is used for connecting the server system to other computers or electronic devices (e.g., electronic devices 102) via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 324, which may be downloaded and executed by a web browser 226 on a computing device 200. In general, the data visualization web application 324 has the same functionality as a desktop data visualization application (e.g., a data visualization application that includes a data visualization user interface), but provides the flexibility of access from any device at any location with network connectivity, and does not require installation and maintenance. In some implementations, the data visualization web application 324 includes various software modules to perform certain tasks. In some implementations, the web application 324 includes a user interface module 326, which provides the user interface for all aspects of the web application 324. In some implementations, the web application 324 includes a data retrieval module 328, which builds and executes queries to retrieve data from one or more data sources 258. The data sources 258 may be stored locally on the server system 300 or stored in an external database. In some implementations, data from two or more data sources may be blended. In some implementations, the data retrieval module 328 uses a visual specification 344 to build the queries. In some implementations, the data visualization web application 324 also includes a data visualization compiler and a data visualization virtual machine (not shown);
- a natural language processing interface 330, which receives and parses queries provided by a computer system or an electronic device 102 that includes natural language input functionality. In some implementations, the queries include natural language inputs provided by a user of the computing device 200. In some implementations, the natural language processing interface 330 identifies analytical expressions 332, such as aggregation expressions, group expressions, filter expressions, limit expressions, and/or sort expressions.
- the natural language processing interface 330 may also include a dependency determination module 334, which looks up dependencies in the database/data sources 258 to determine how particular terms and/or phrases are related (e.g., dependent);
- in some implementations, the natural language processing interface 330 includes a filter generation module 336, which determines if one or more filters are related to a field that has been modified by a user. The filter generation module 336 generates the one or more filters based on user selections;
- a data visualization platform 338, which includes:
  a data visualization generator 340, which automatically generates and displays a corresponding visual graphic (also referred to as a "data visualization" or a "data viz") using user inputs (e.g., natural language input)

a visual representation generator 342 (optional), which generates representations of data visualizations and sends the generated representations to the electronic device 200. In some implementations, the representation of the data visualization is an image file of the data visualization (e.g., the image file is a .png, .tiff, or .jpg file). In some implementations, the representation of the data visualization includes a link to an image. In some implementations, the representation of the data visualization is a link (e.g., a URL link) to the data visualization.

visual specifications 344, which are used to define characteristics of a desired data visualization. In some implementations, the information the computing device 200 provides (e.g., via user input) is stored as a visual specification. In some implementations, the visual specifications 344 includes previous natural language commands received from a user or properties specified by the user through natural language commands. In some instances, a visual specification 344 includes two or more aggregations based on different levels of detail;

zero or more databases or data sources 258. In some implementations, the data sources are stored as spreadsheet files, CSV files, XML files, flat files, or JSON files, or stored in a relational database. For example, a user selects one or more databases or data sources 258 (which may be stored on the server system 300 or stored remotely), selects data fields from the data sources, and uses the selected fields to define a visual graphic;

zero or more semantic models 260, as described in FIG. 2A;

a grammar lexicon 262, as described in FIG. 2A;

zero or more data source lexicons 264, as described in FIG. 2A;

zero or more lenses 265 (e.g., a first lens 265-1), as described in FIG. 2A; and zero or more object models 267, as described in FIG. 2A.

In some implementations the server system 300 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules.

In some implementations, canonical representations are assigned to the analytical expressions 332 (e.g., by the natural language processing module 330) to address the problem of proliferation of ambiguous syntactic parses inherent to natural language querying. The canonical structures are unambiguous from the point of view of the parser and the natural language processing module 330 is able to choose quickly between multiple syntactic parses to form intermediate expressions.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Figure 4:
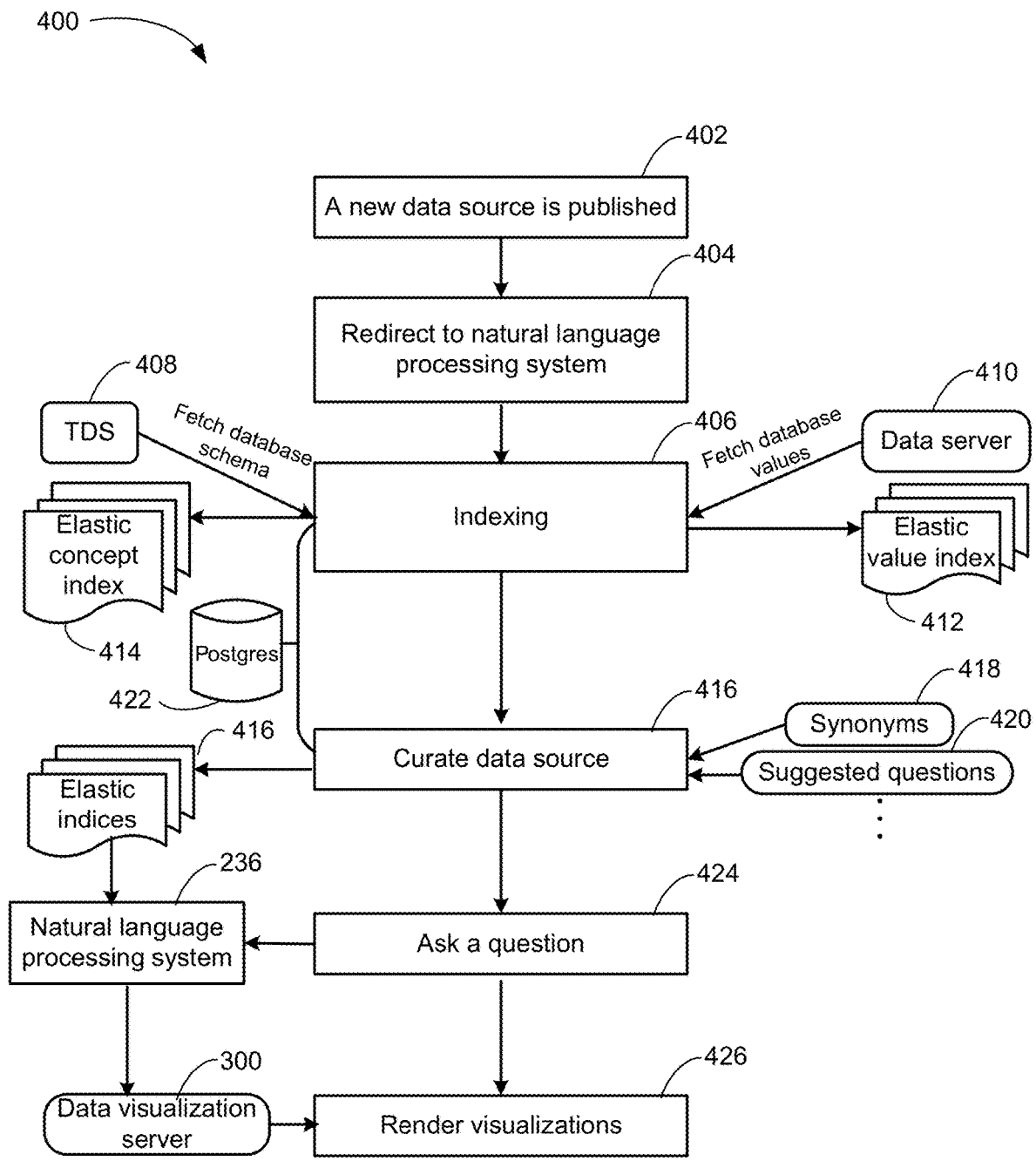
FIG. 4 illustrates an exemplary process for generating data visualizations using lenses according to some implementations.

FIG. 4 illustrates an exemplary process 400 for generating data visualizations using lenses according to some implementations. The process 400 is performed at a computing system 200.

In some implementations, the process 400 comprises publishing (402) a new data source 258. The process 400 redirects (404) the published data source to a natural language processing system (e.g., the natural language processing system 236), where the data source is indexed (406). In some implementations, at the indexing step 406, the computing system retrieves a database schema from a Tableau Data Source (TDS) server 408 (e.g., a server system 300) and retrieves values of the published data source from a data server or the server system 410 (e.g., a server system 300). The computing system generates an index 412 for data values of data fields in the data source and generates an index 414 for concepts of data values and/or data fields in the data source. In some implementations, the computing system also generates one or more of: a semantic model 260, a grammar lexicon 262, and/or a data source lexicon 264 at the indexing step 406.

FIG. 4 also illustrates that, in some implementations, the process 400 comprises curating (416) the data source by creating one or more lenses 265 for the data source. As used herein, curation refers to fine-tuning subsequent user experience with the natural language processing system by specifying metadata (e.g., supplemental metadata) for the data source. In some implementations, the supplemental metadata specified by the lens includes synonyms 418, such as synonyms for a subset of data fields from the data source and/or data values of data fields from the data source. In some implementations, the supplemental metadata specified by the lens includes suggested questions 420 about data values and/or data fields from the data source. In some implementations, the supplemental metadata specified by the lens also includes filters, synonyms of analytical expressions, descriptions of data fields, and/or descriptions of data values. In some implementations, the curated content is indexed (e.g., forming elastic indices 416) of the lens.

In some implementations, the lenses (and their supplemental metadata and indexes), the value index 412, and/or the concepts index 414 are stored in a database 422 of the server system. In some implementations, at least a subset of this data can be downloaded and stored locally on the computing system.

With continued reference to FIG. 4, the process 400 further comprises, at step 424, a user interaction with the computing system. For example, the user can ask a question (e.g., input a natural language command) directed to the data source. In some implementations, in response to the natural language command, the computing system (e.g., via the natural language processing system 236) can interpret the command by sending queries to both the data source index and the lens index. For example, the computing system issues a first query to the data source index (all of the data source's indexed values) filtered down specifically to the data that is relevant to that lens. The computing system then issues a second query to issued to the lens index, to augment that data with lens-specific metadata. In some implementations, the computing system combines metadata from the underlying data source and the lens to produce the interpretation. In some implementations, the computing system determines data fields and/or data values from the data source for interpreting the natural language command in accordance with the metadata from the lens. The computing system translates the natural language command into one or more executable database queries referencing data fields and/or data values specified in the natural language query.

The computing device sends the one or more database queries (e.g., to a data visualization server 300) to retrieve data from the data source. The computing system renders (426) (e.g., generates and displays) one or more data visualizations using the retrieved data.

Figure 5A:
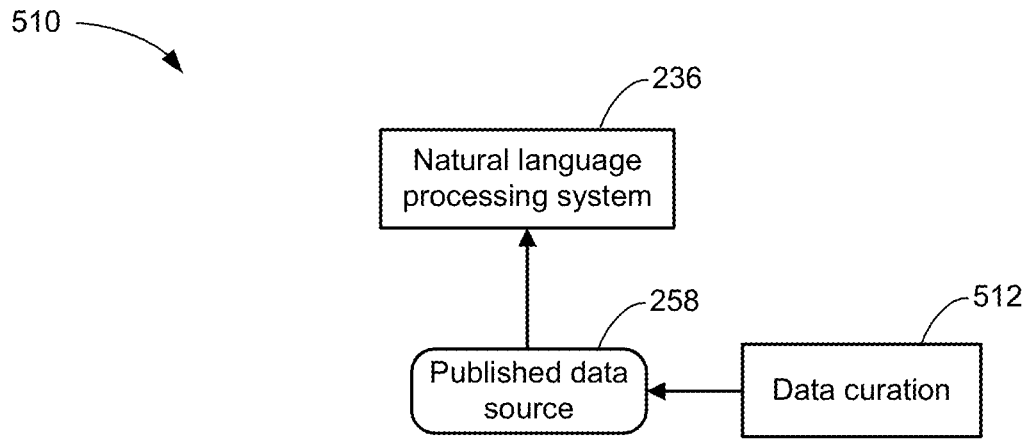
FIGS. 5A and 5B illustrate, respectively, interactions between a natural language processing system and a published data source without the use of lenses and using lenses, according to some implementations.

FIG. 5A illustrates interactions 510 between a natural language processing system 236 and a published data source 258 without the use of lenses in accordance with some implementations. FIG. 5A illustrates in some implementations, data curation 512 directly affects the published data source 258 (e.g., editing metadata in the data source 258). In general, only a data source owner can edit metadata in the data source. The data source owner typically has to duplicate the entire data source 258 prior to editing metadata, to avoid impacting other content connecting to the data source 258. Thus, in order to tailor metadata for specific business use cases, the data source owner will have to duplicate multiple copies of the data source 258 and then modify the metadata for each respective copy according to the specific use case. In some circumstances, simplifying the data source 258 (such as removing unnecessary fields or calculations used for dashboards, adding filters, or reshaping the data) can impact connected dashboards and can undermine the reusability of published data sources as they are duplicated for data curation.

Figure 5B:
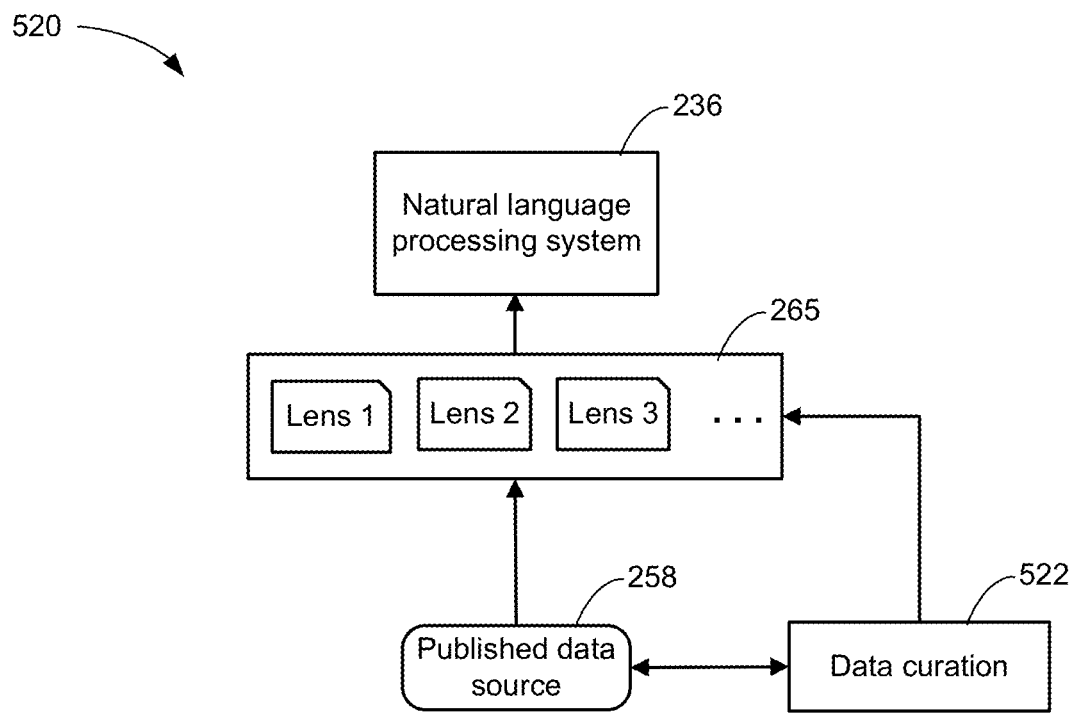

FIG. 5B illustrates interactions 520 between a natural language processing system 236 and a published data source 258 using lenses 265 in accordance with some implementations. FIG. 5B depicts in some implementations, the lenses 265 add a new layer that is separate from, but associated with (e.g., connected to) the data source. In some implementations, a lens includes an identifier, an owner, and permissions governing user access. Edits to a lens do not impact the underlying data source 258; nor do they affect prior visual analytics data that was generated from the data source 258. Thus, in the scenario of FIG. 5B, content can be curated (522) by a user (as opposed to the data source owner) who understands the business use case and the business user needs. Accordingly, lenses empower a wider audience of analysts to curate data, which in turn improve their experiences with natural language processing systems for their specific business use cases.

Figure 6A:
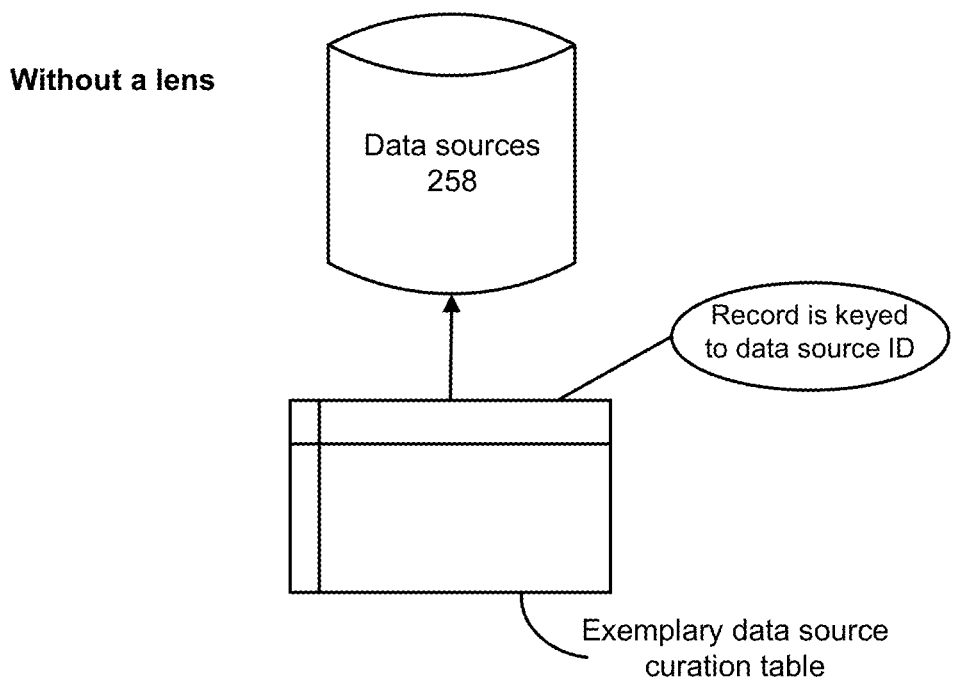
FIGS. 6A and 6B illustrate, respectively, a curation data record without the use of a lens and with the use of a lens, in accordance with some implementations.
Figure 6B:
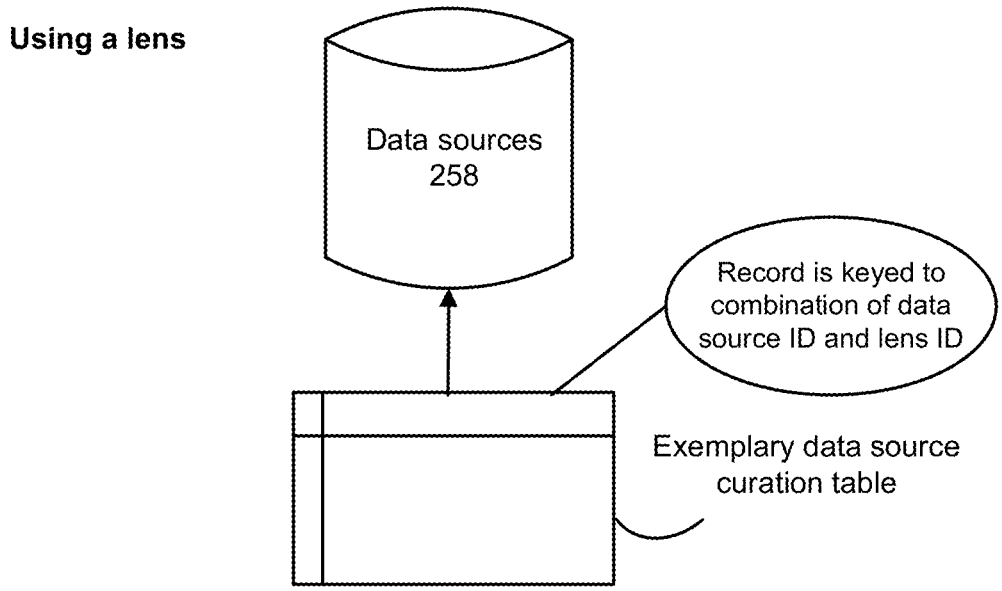

FIGS. 6A and 6B illustrate, respectively, curation data records without the use of a lens and with the use of a lens, in accordance with some implementations. FIG. 6A depicts that, prior to lenses, a data curation record is keyed to an identifier of the data source.

FIG. 6B shows that with lenses, a data curation record is keyed to a combination of the data source identifier and a lens identifier. In some implementations, a lens can be created for a subset of data fields from two or more data sources. The data curation record corresponding to the lens that includes data fields from two of more data sources includes respective identifiers corresponding to the two or more data sources and the lens identifier.

Figure 7:
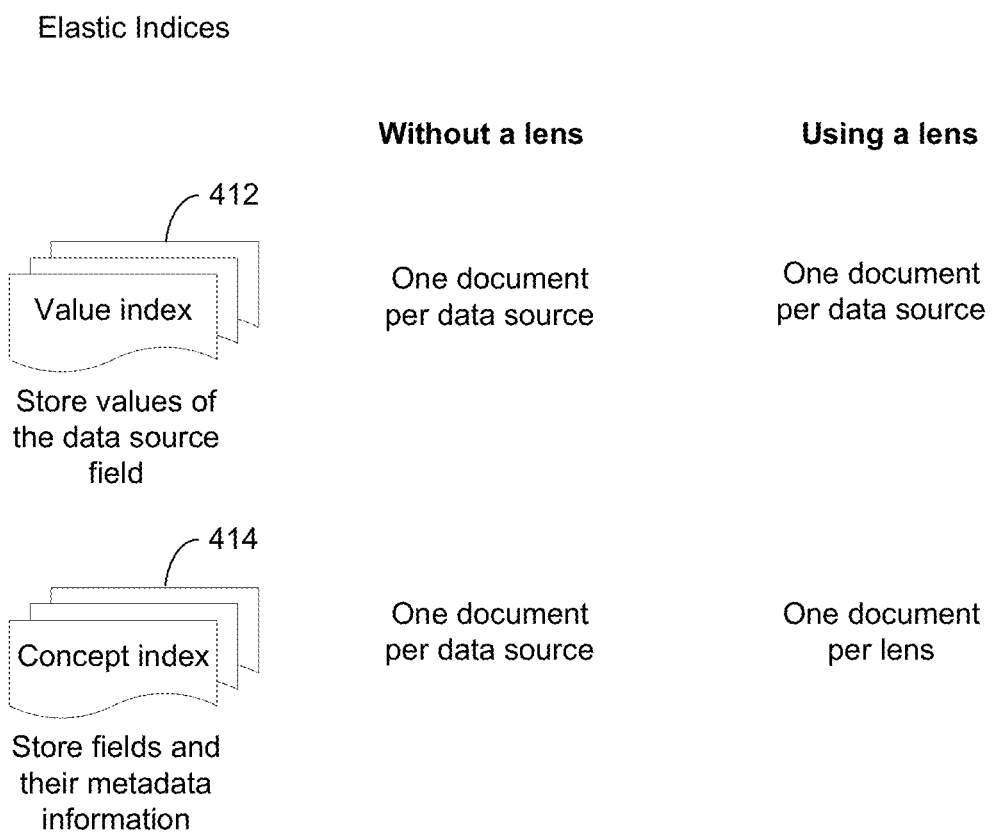
FIG. 7 illustrates elastic indices without a lens and with a lens according to some implementations.

FIG. 7 illustrates elastic indices without a lens and with a lens according to some implementations. The elastic indices include both value indices 412 for data values and concept indices 414 for data fields.

Figure 8:
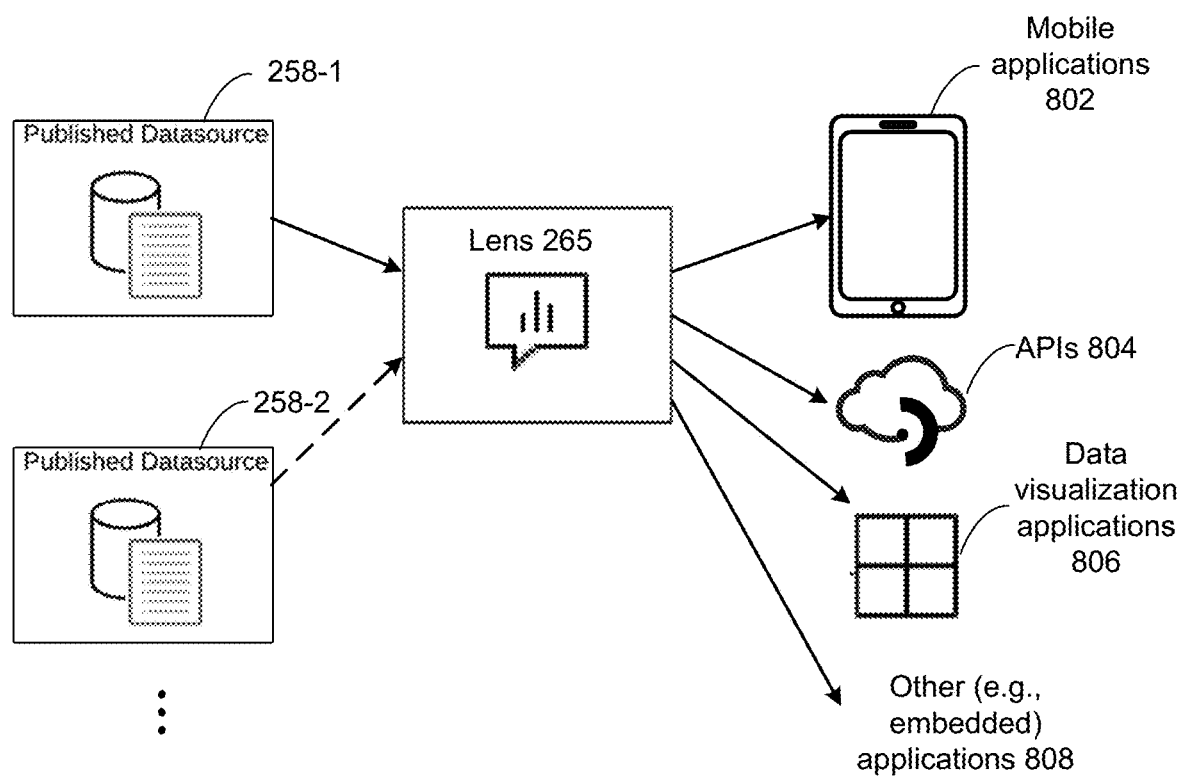
FIG. 8 illustrates various applications in which a lens can be used, in accordance with some implementations.

FIG. 8 illustrates various applications in which a lens can be used, in accordance with some implementations. In some implementations, a lens 265 can be created using data fields and/or data values from one or more published data sources 258 (e.g., the data sources 258-1 or 258-2). The lens 265 can be implemented on (e.g., consumed by) applications such as mobile applications 802 (e.g., a chat application or a messaging application) running on mobile devices, APIs 804, data visualization applications 806, and/or other applications 808 (e.g., embedded applications). In some implementations, lenses can be accessed by users in many different ways, including directly from the data source, through a dashboard object on a data visualization application, and/or via API calls.

Figure 9:
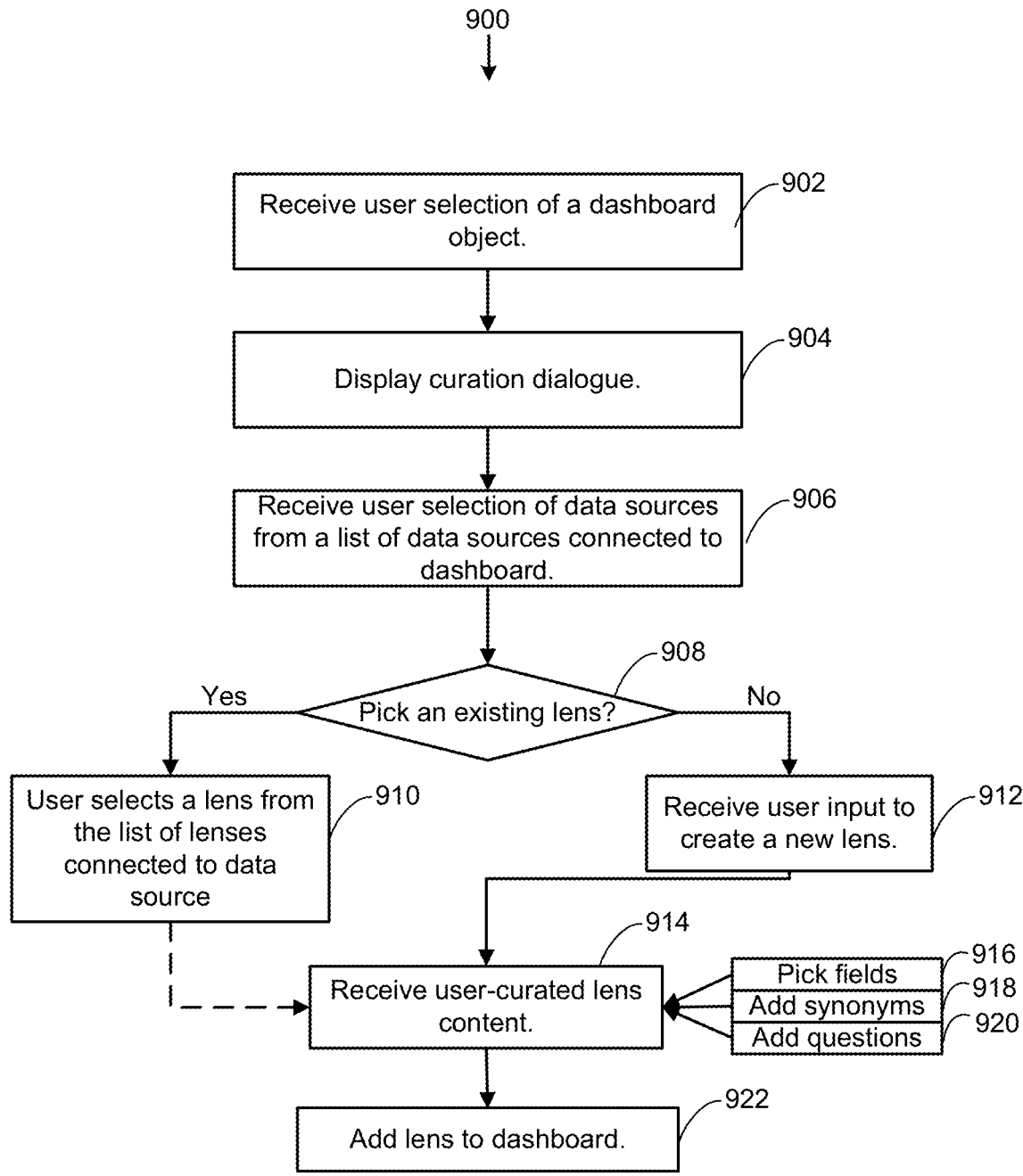
FIG. 9 illustrates an exemplary process for creating a lens according to some implementations.
Figure 10A:
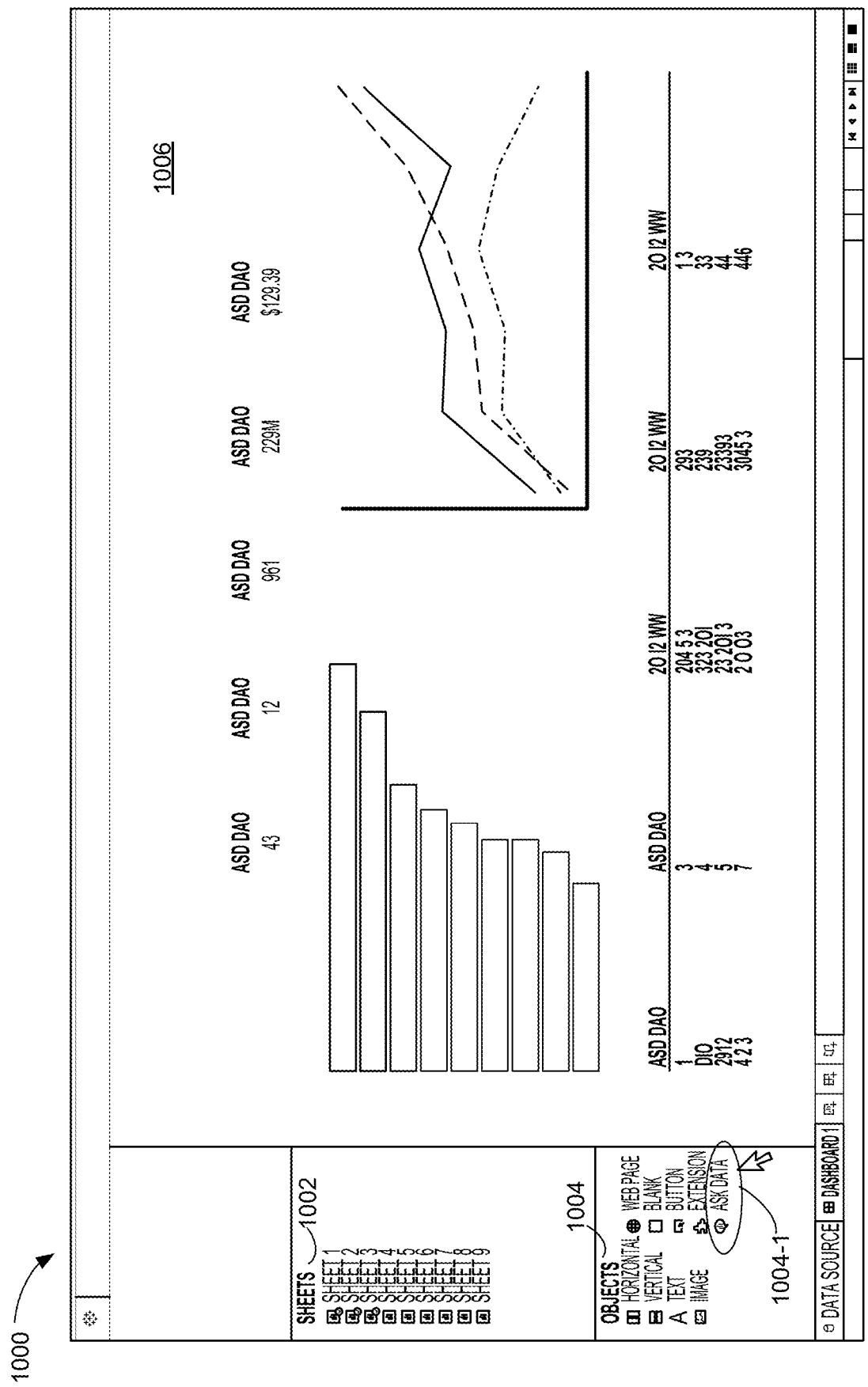
FIGS. 10A-10V provide a series of screen shots for creating a lens according to some implementations.
Figure 10B:
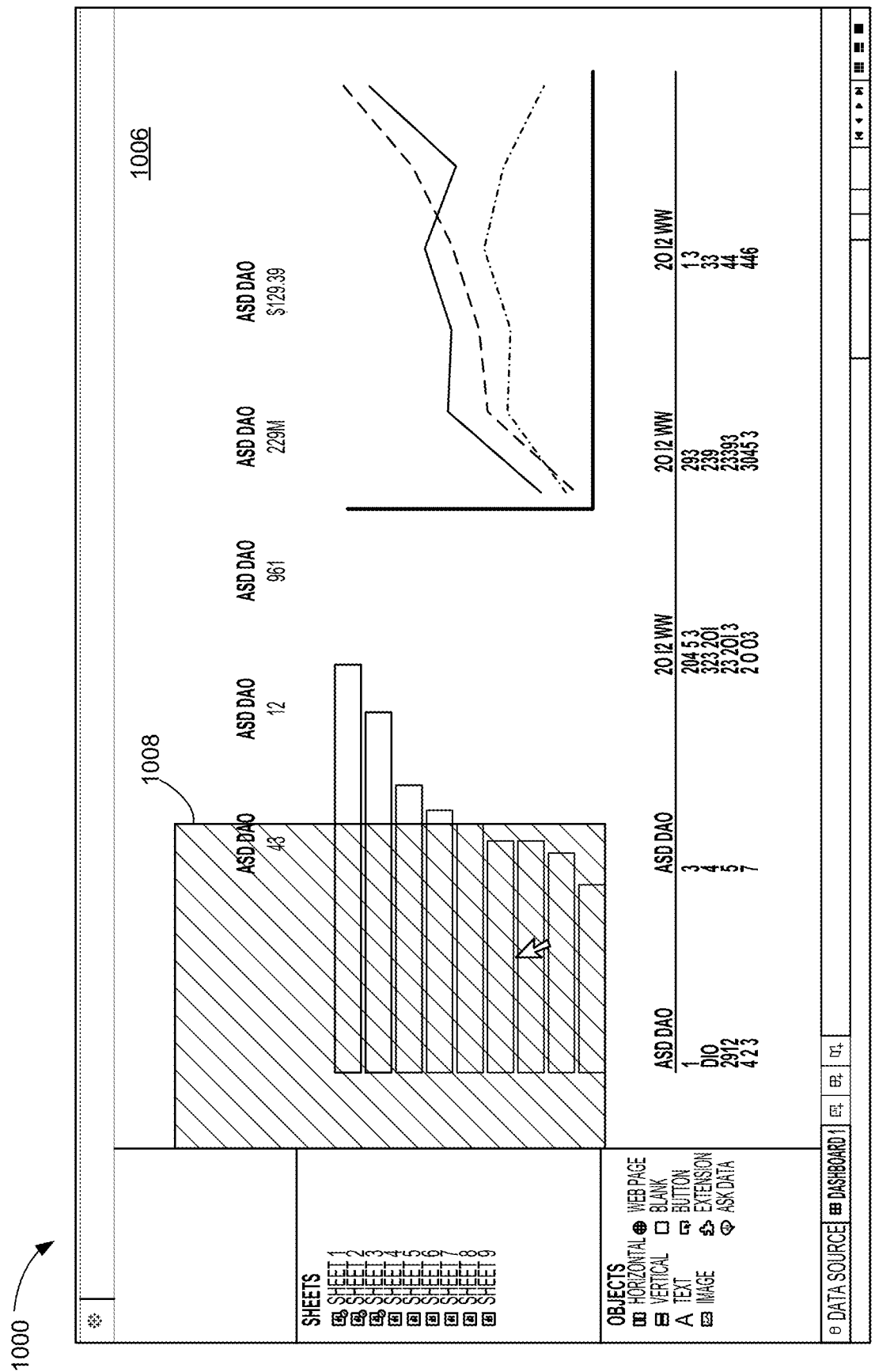

FIG. 9 illustrates an exemplary process 900 for creating a lens using a dashboard of a data visualization application 230 running on a computer system 200 according to some implementations. FIGS. 10A-10V provide a series of screen shots for creating a lens using a dashboard (e.g., a graphical user interface 1000) according to some implementations. The various steps in the process 900 are discussed with reference to FIGS. 10A-10V.

FIG. 10A illustrates a dashboard 1000 (e.g., a graphical user interface) for data visualization according to some implementations. In some implementations, the dashboard 1000 corresponds to a user interface of the data visualization application 230. The dashboard 1000 includes sheets (e.g., worksheets) 1002. Each sheet 1002 provides a respective area where the user can create views for data analysis. In some implementations, and as illustrated in FIG. 10A, the dashboard 1000 also includes dashboard objects 1004 that can be selected by the user (e.g., by dragging and dropping a respective dashboard object onto a data visualization region 1006).

Referring to FIG. 9, in some implementations, the computing system receives (902) user selection of a dashboard object. For example, an author (e.g., a curator) of a lens can initiate creation of a lens 265 by dragging (902) a dashboard object to a data visualization region on the dashboard 1000. FIG. 10A shows a user interacting with the dashboard object 1004-1 (e.g., the "Ask Data" dashboard object or a natural language processing dashboard object). Here, the user selects the dashboard object 1004-1, and drags and drops it onto a data visualization region 1006 (e.g., onto a first region 1008), as depicted in the transition from FIG. 10A to FIG. 10B.

Figure 10C:
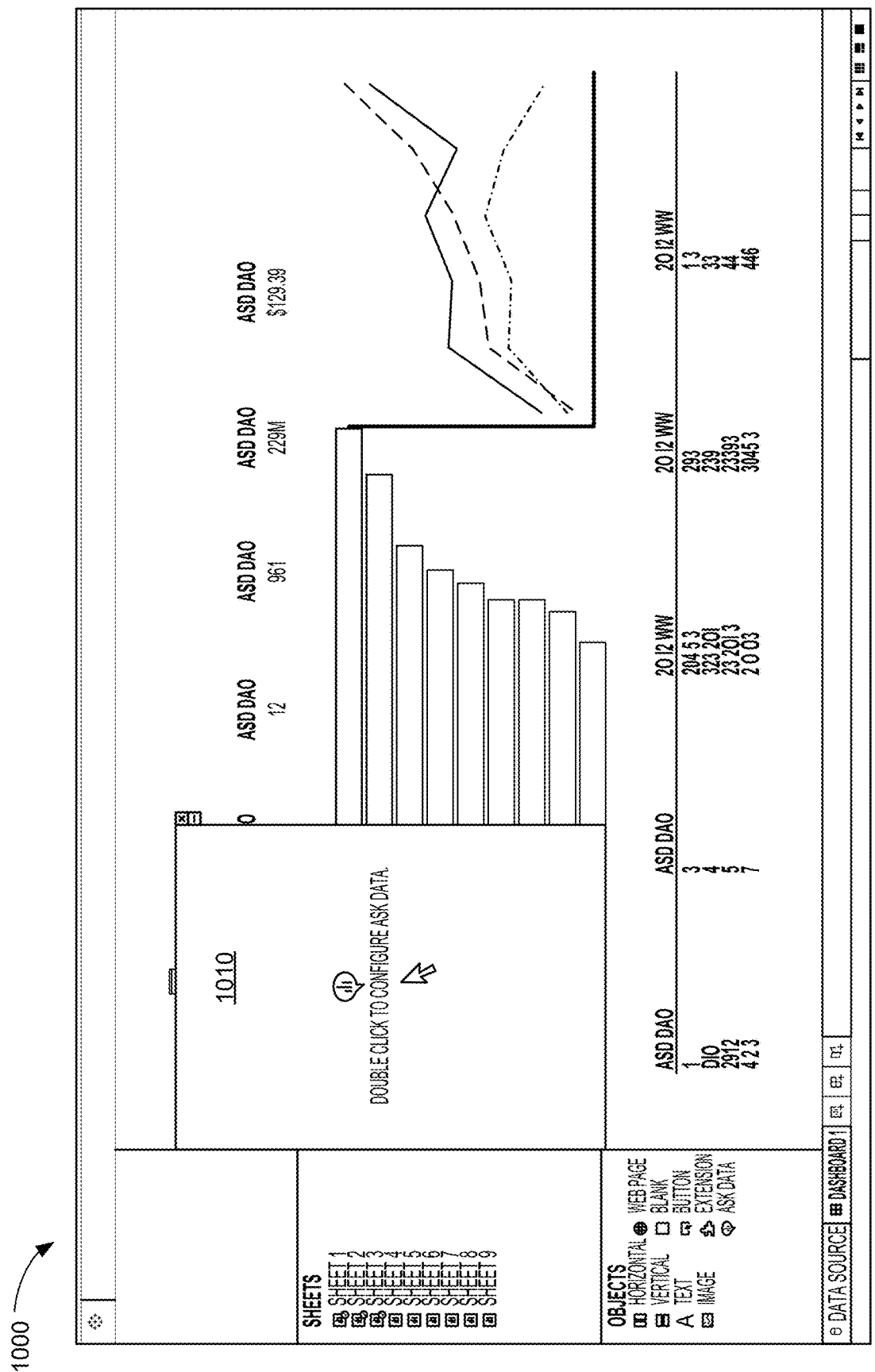

In some implementations, in response to the user interaction with the dashboard object 1004-1, the computing device displays (904) a curation dialogue (e.g., a window) 1010, as illustrated in FIG. 10C. FIG. 10C also depicts the user double-clicking on the curation dialogue 1010.

Figure 10D:
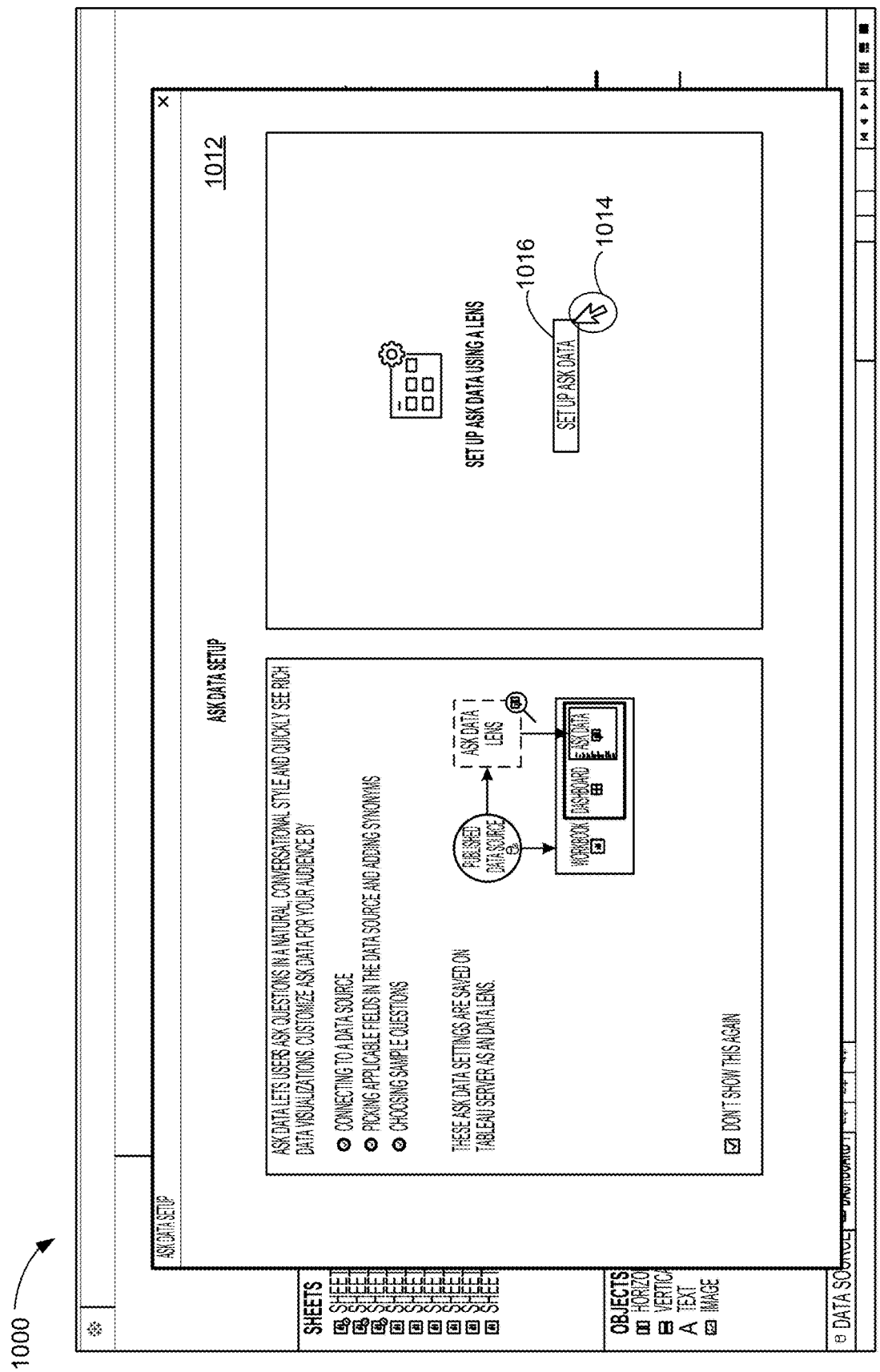
Figure 10E:
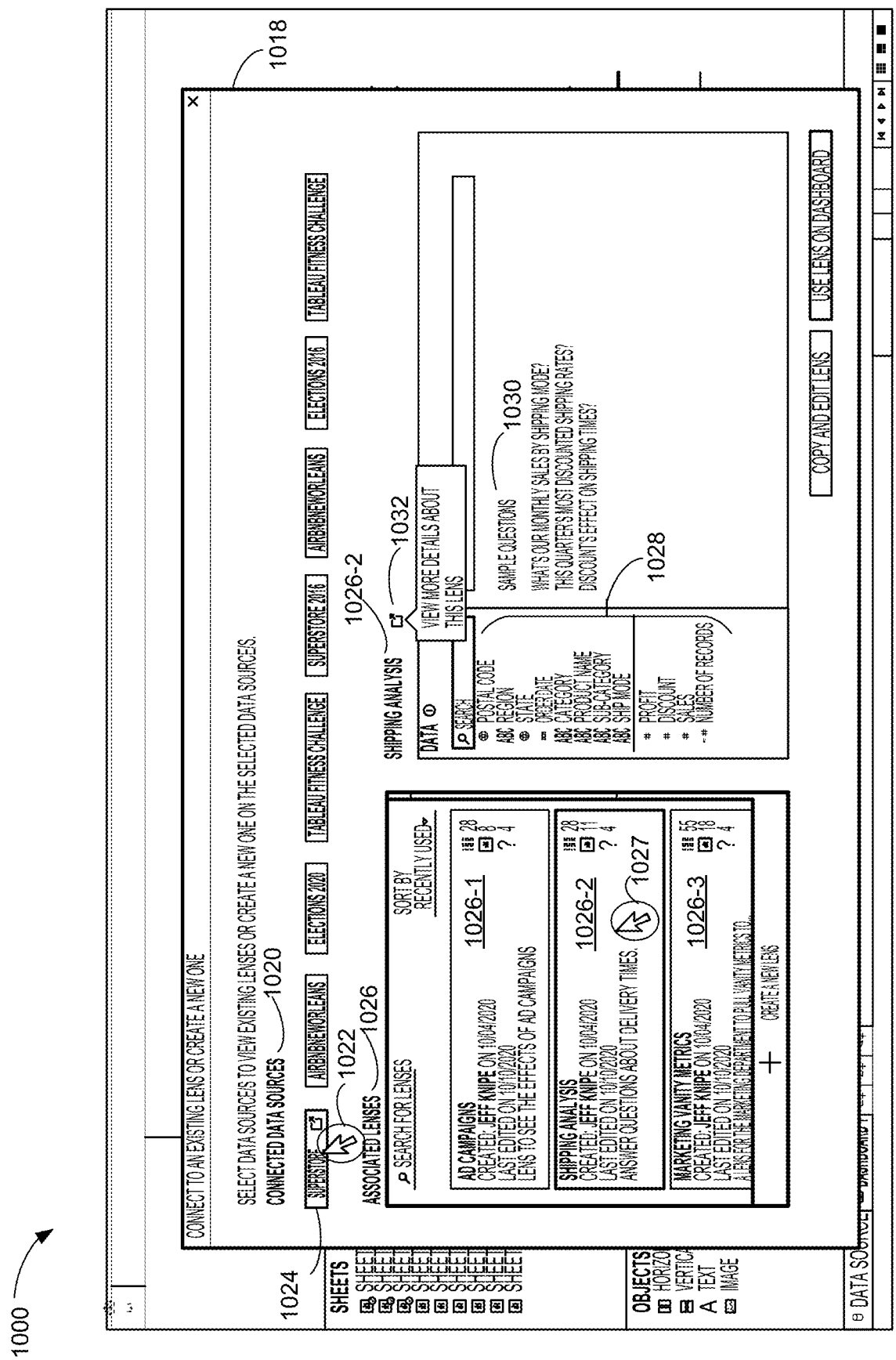

FIG. 10D illustrates the computing system displaying a setup window 1012 in response to the user interaction. The computing system also receives user selection (1014) of a user-selectable option 1016 (e.g., "Set up Ask Data"). FIG. 10E illustrates in response to the user selection, the computing system displays a window 1018 that identifies data sources 1020 that are connected to the data visualization application. In some implementations, the computing system displays a link to the respective data source page in response to the user hovering over a data source (e.g., via a mouse).

Referring again to FIG. 9, in some implementations, the computing system receives (906) user selection of one or more data sources from the list of data sources (e.g., the data sources 258) connected to the dashboard 1000. FIG. 10E illustrates user selection (1022) of a data source 1024 (e.g., "Superstore"). In some implementations, in response to user selection of a data source, the computing system displays a list of lenses 1026 (e.g., lenses 265) corresponding to the selected data source. In the example of FIG. 10E, the data source 1024 "Superstore" includes a lens 1026-1 "Ad Campaign," a lens 1026-2 "Shipping Analysis," and a lens 1026-3 "Marketing Vanity Metrics." Each of the lenses includes a respective subset of data fields of the data source and respective user-specified metadata (e.g., for addressing a particular business need). FIG. 10E also illustrates user selection (1027) of the lens 1026-2 "Shipping Analysis." In some implementations, in response to the user selection, the computing system displays (e.g., in the window 1018) a subset of data fields 1028 of the data source and/or suggested questions 1030 corresponding to the selected lens. A user can also select an affordance 1032 to view more details about the lens.

Figure 10F:
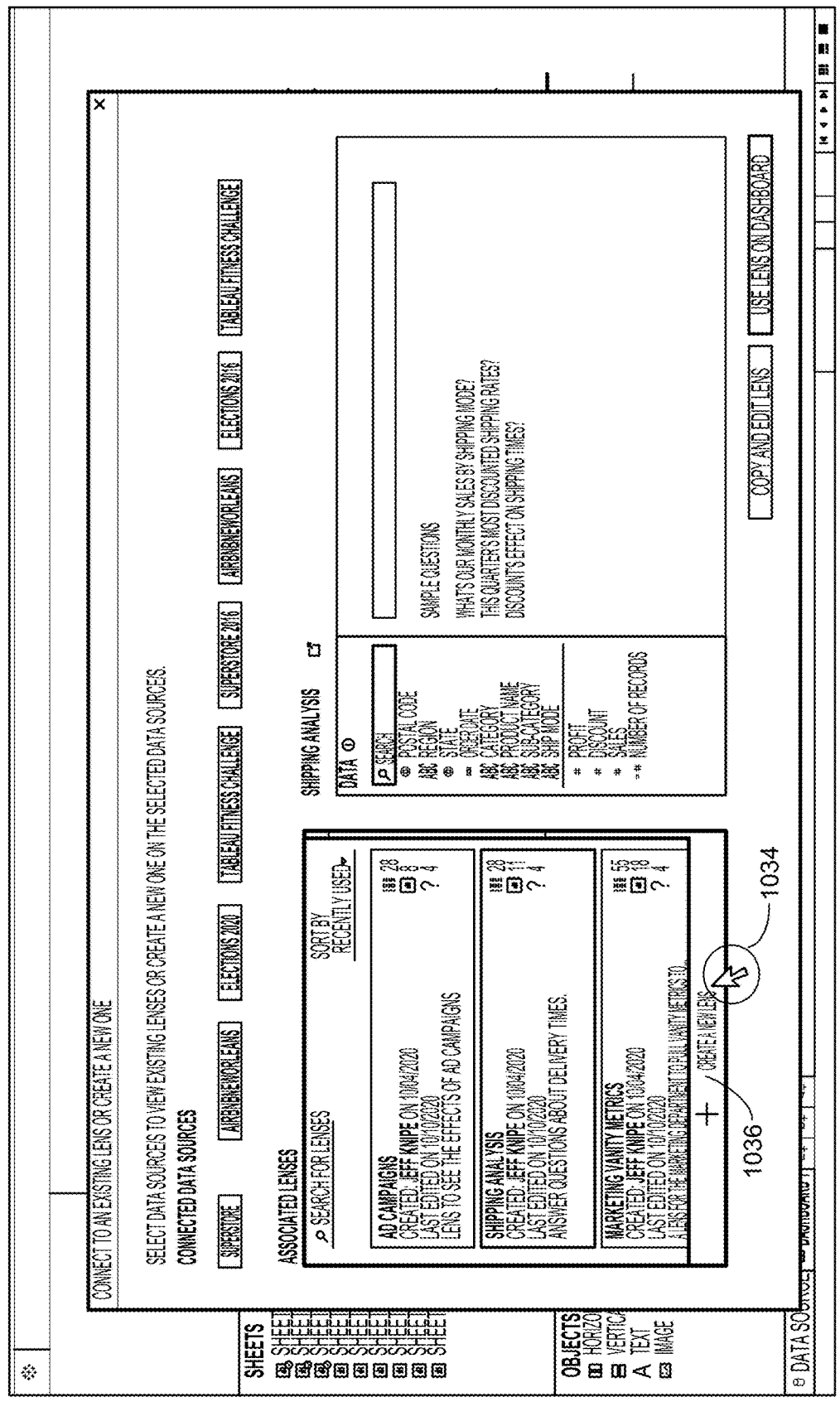
Figure 10G:
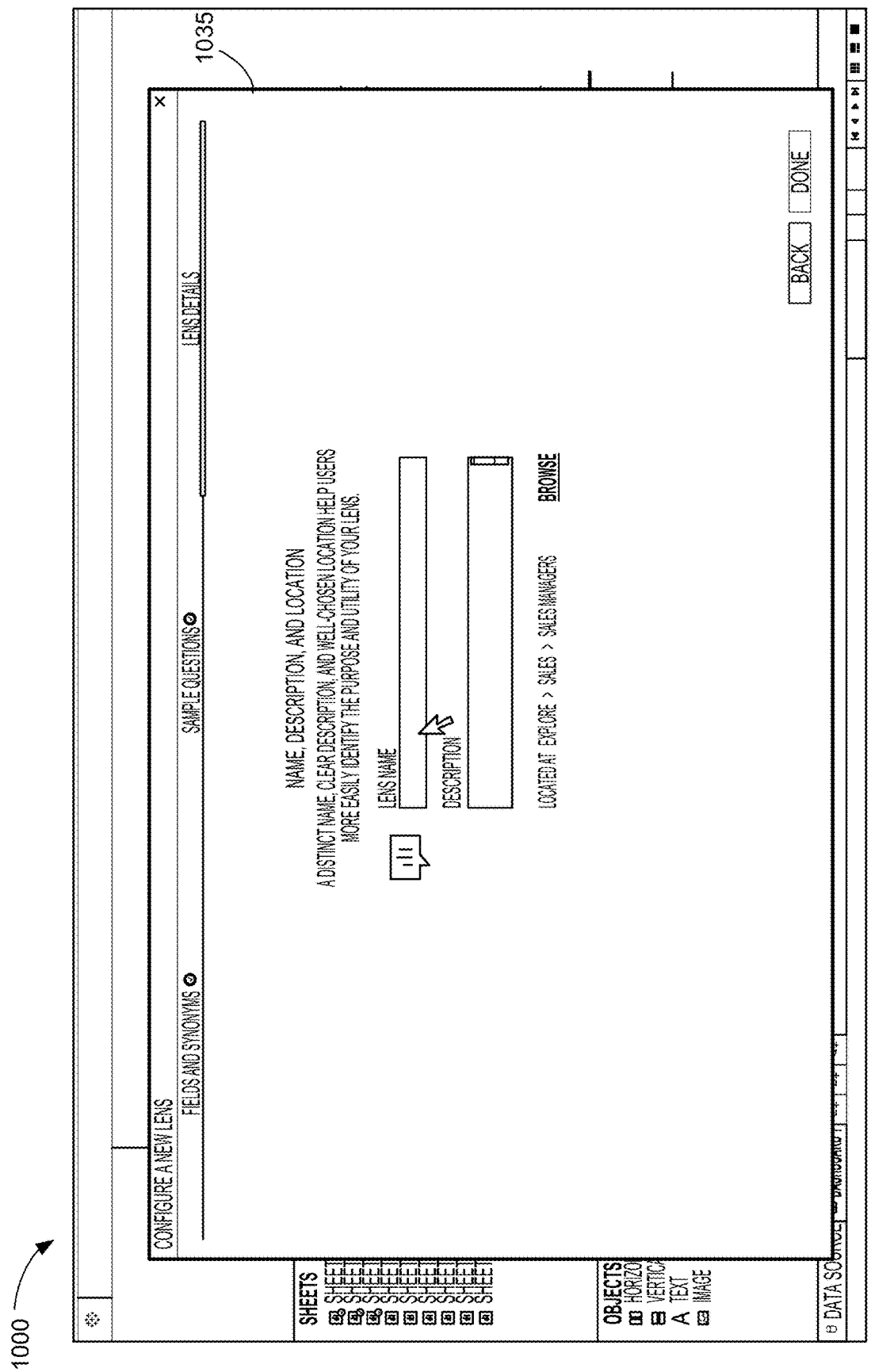
Figure 10H:
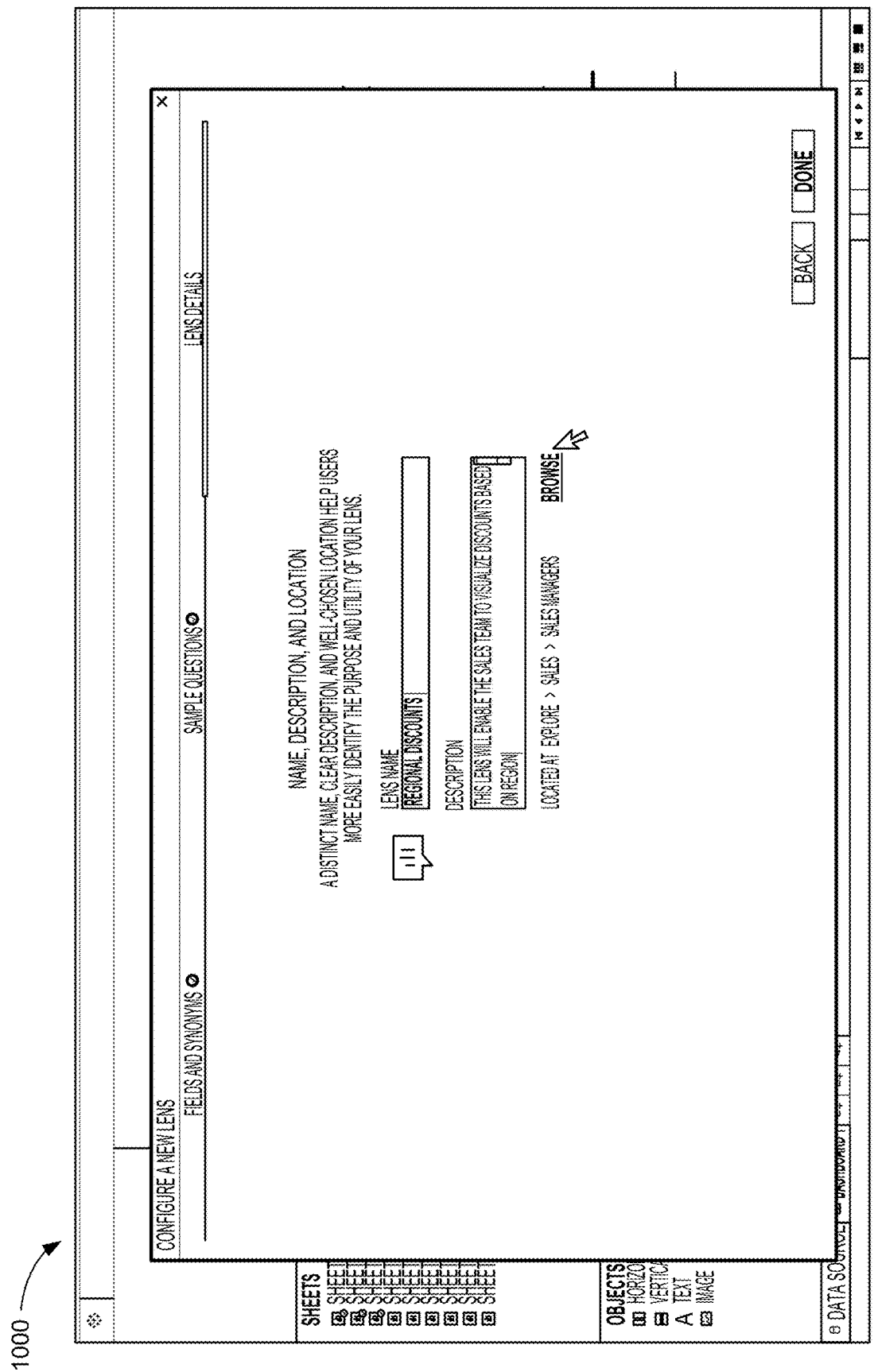
Figure 10I:
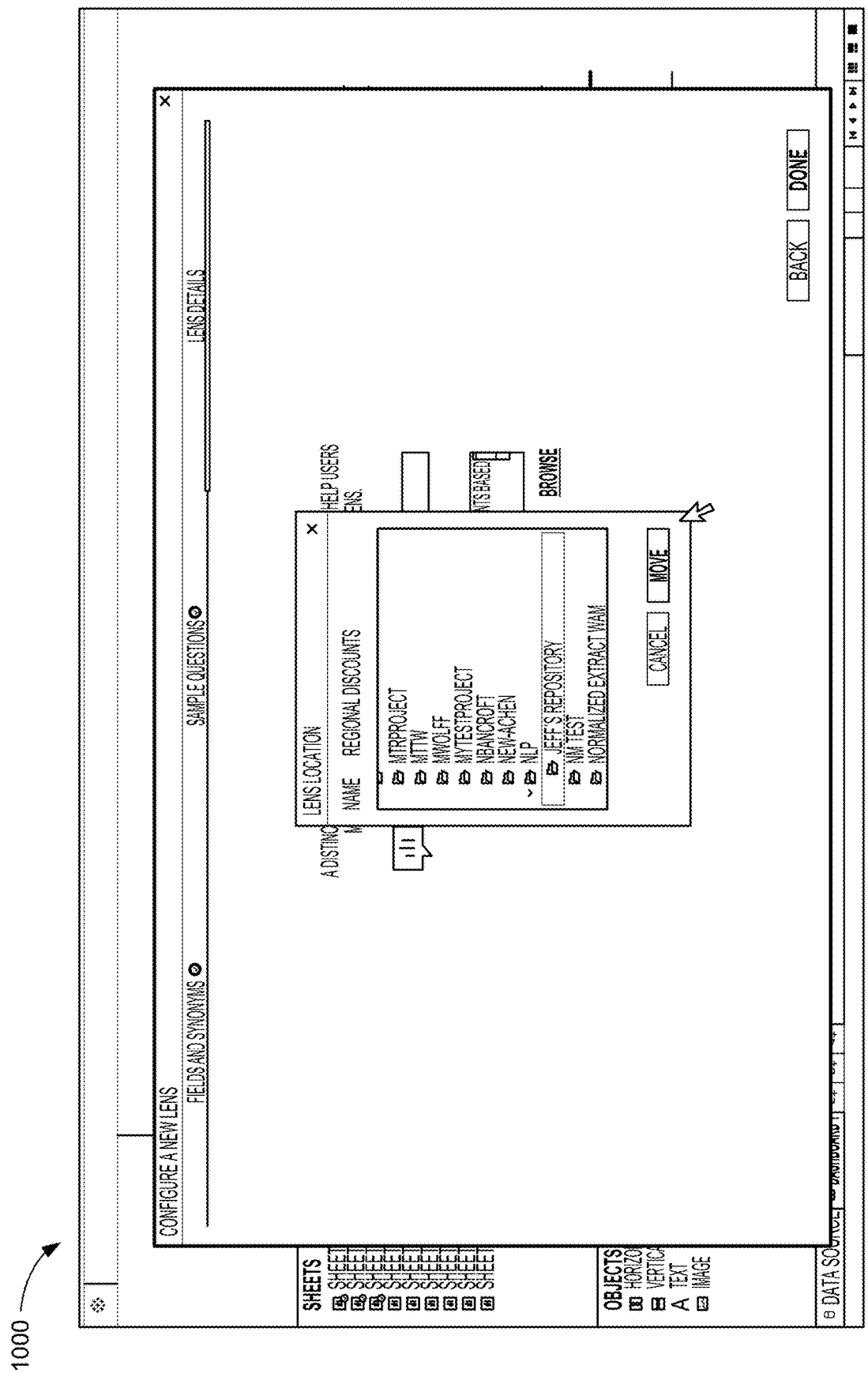
Figure 10J:
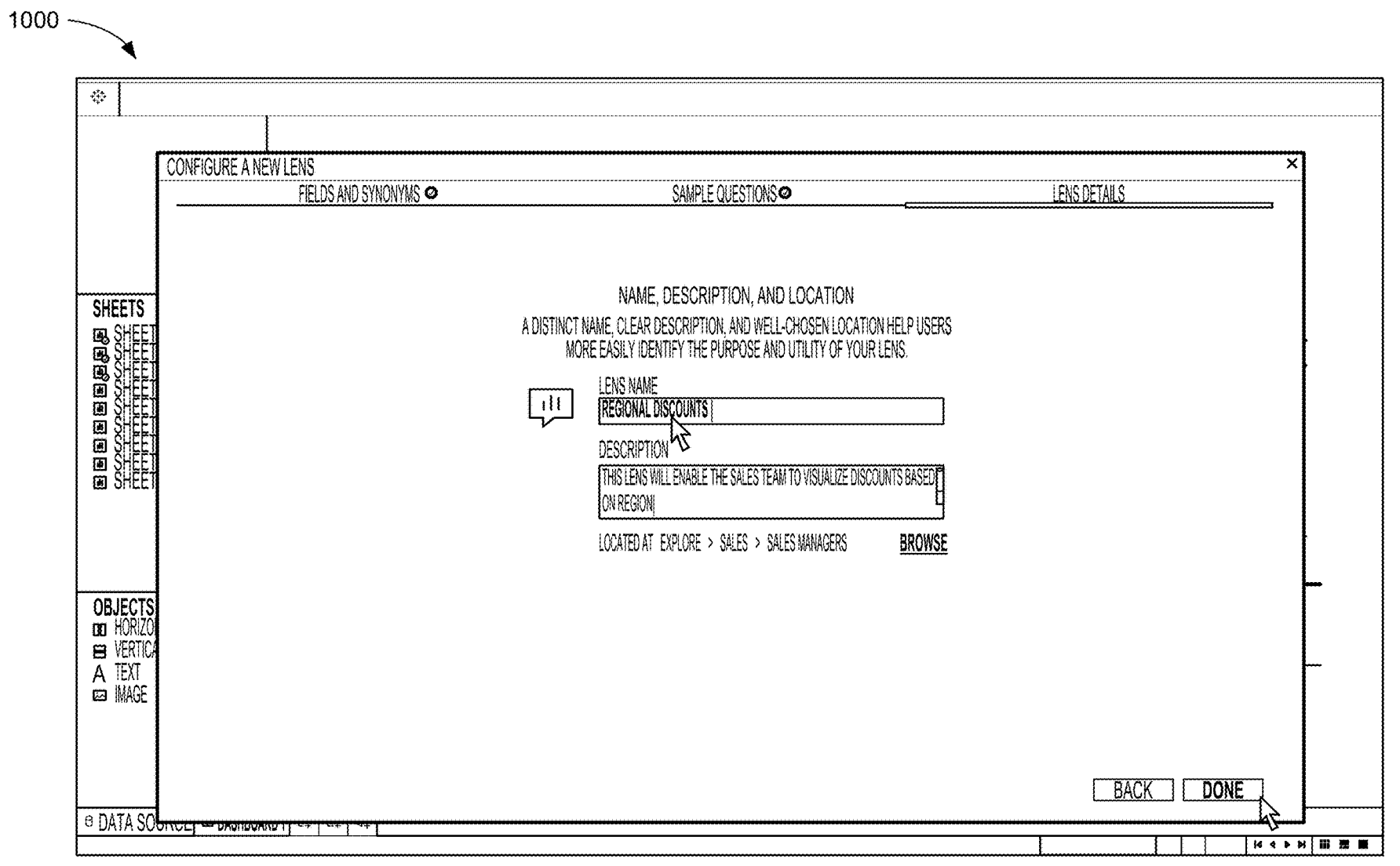
Figure 10K:
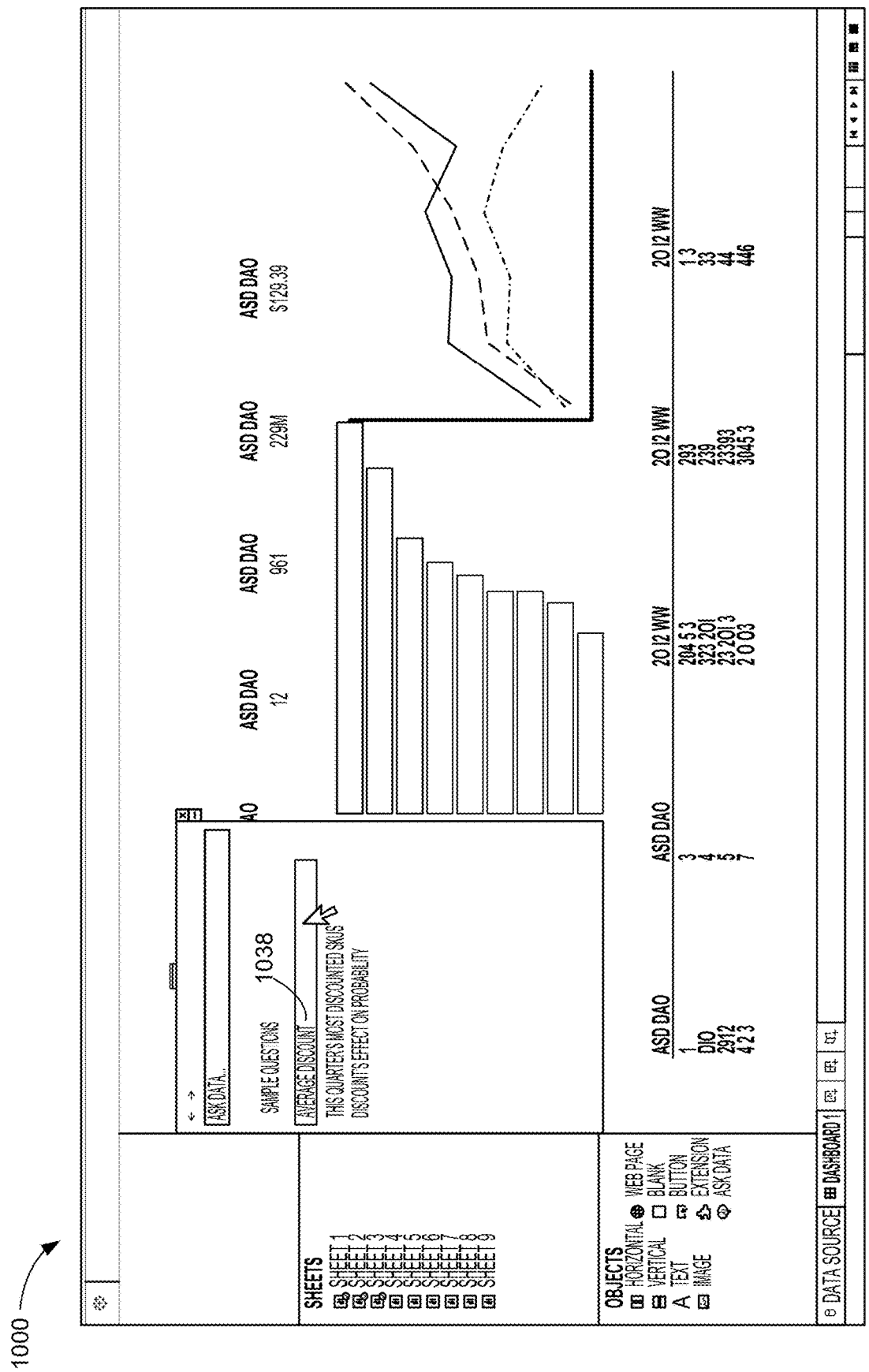
Figure 10L:
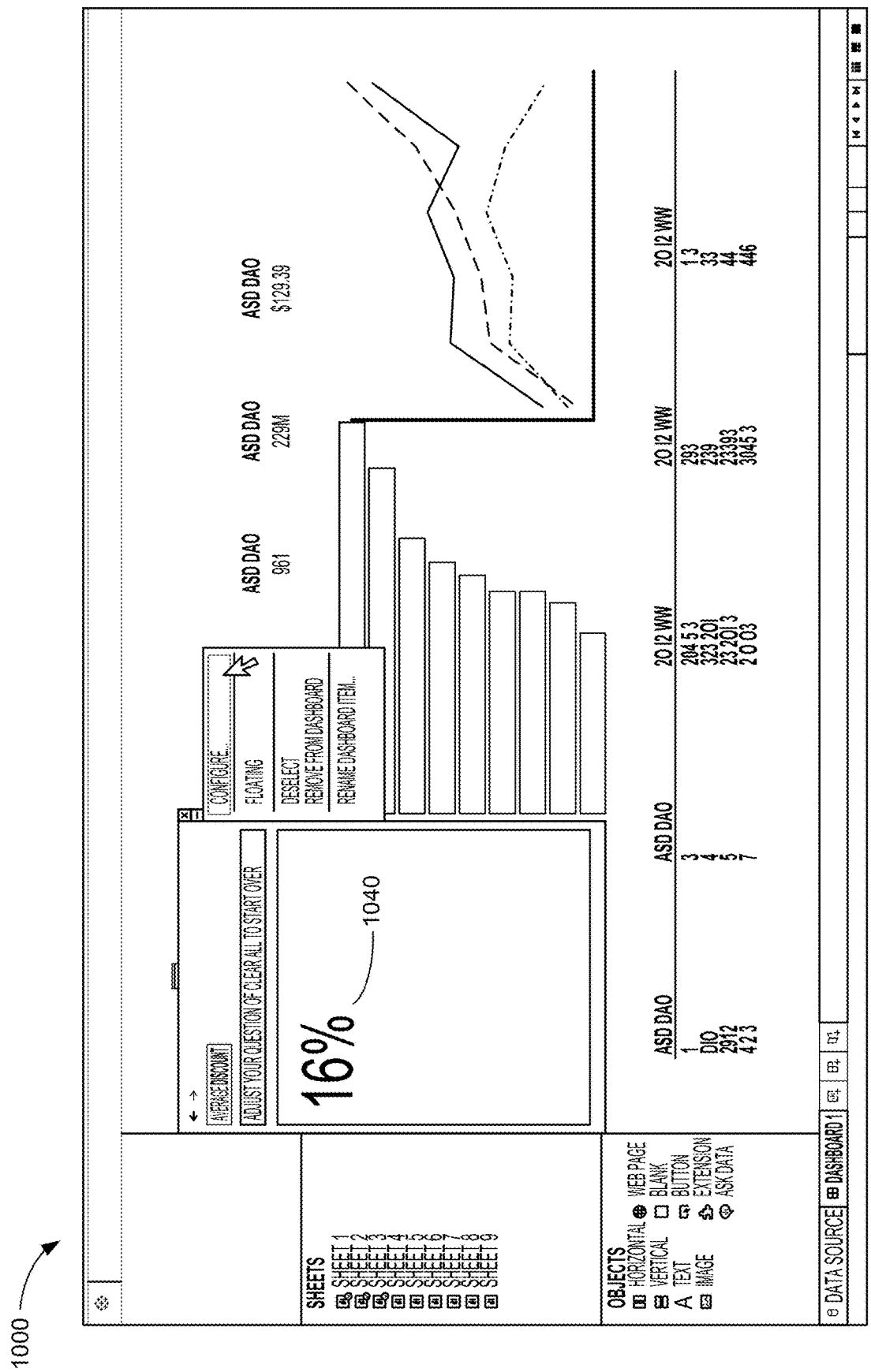

In some implementations, and as illustrated in FIG. 9, the computing system can add (922) a lens to the dashboard, via receiving (912) user input to create a new lens and receiving (914) user-curated lens content, including a subset of data fields (916) from the data source, metadata for synonyms (918) of the subset of data fields and/or data values of data fields in the data source, and/or suggested questions (920) for the lens. This is illustrated in FIGS. 10F-10L. FIG. 10F depicts user selection (1034) of a user-selectable option 1036 (e.g., "Create a new lens"). FIG. 10G shows in response to the user input to create a new lens, the computing system displays a window 1035, which includes prompts to the user to enter a name and description (e.g., label) for the lens. FIG. 10H illustrates user (e.g., author or curator) input of a lens name (e.g., "Regional Discounts") and a corresponding description of the lens. FIGS. 10I and 10J illustrate user selection of a location (e.g., on the computing system or on a server system) in which the lens is to be saved. FIGS. 10K and 10L illustrate the user inputting a suggested question 1038 (e.g., "Average Discount") and a response 1040 (e.g., "16%") for the lens.

Figure 10M:
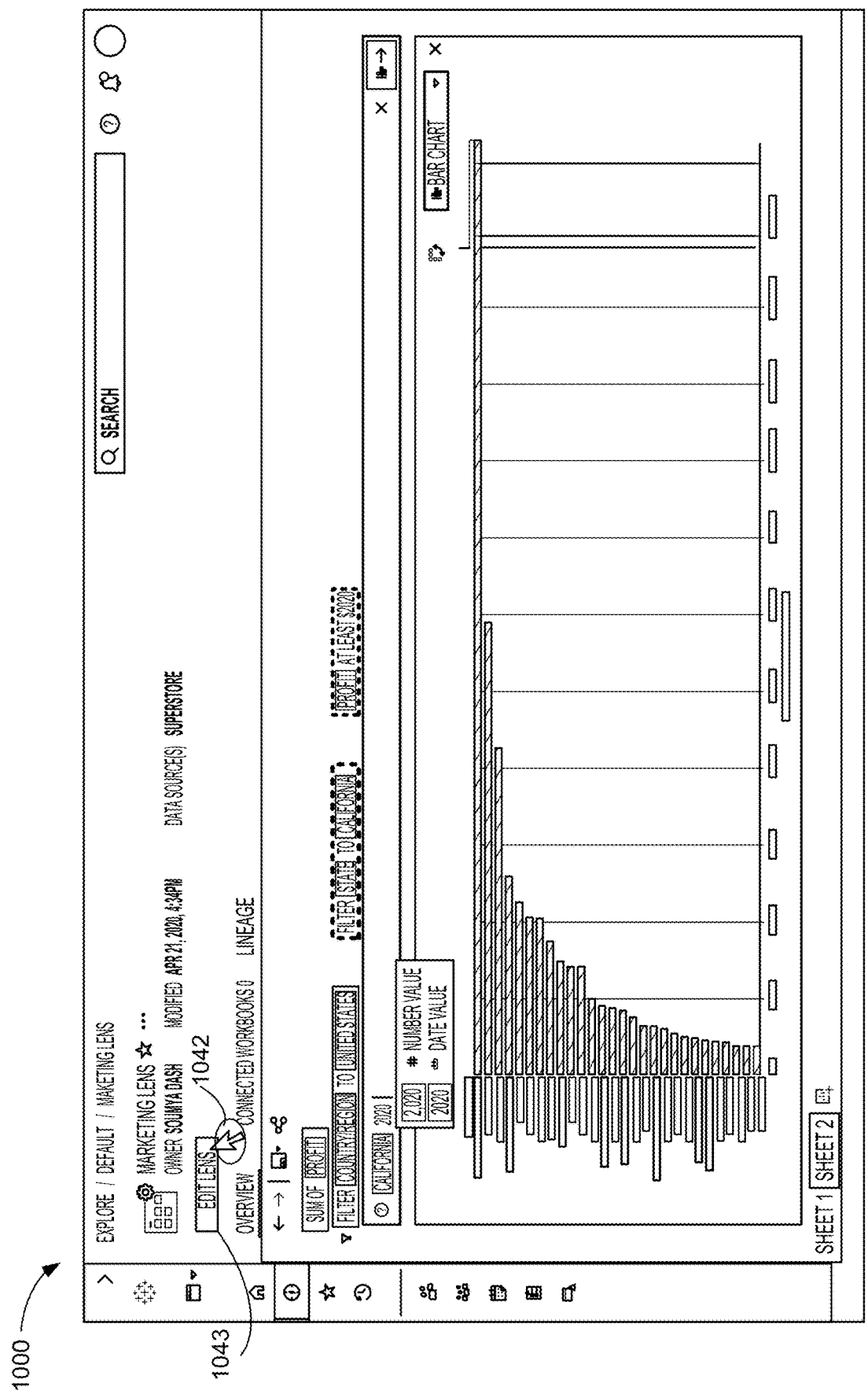
Figure 10N:
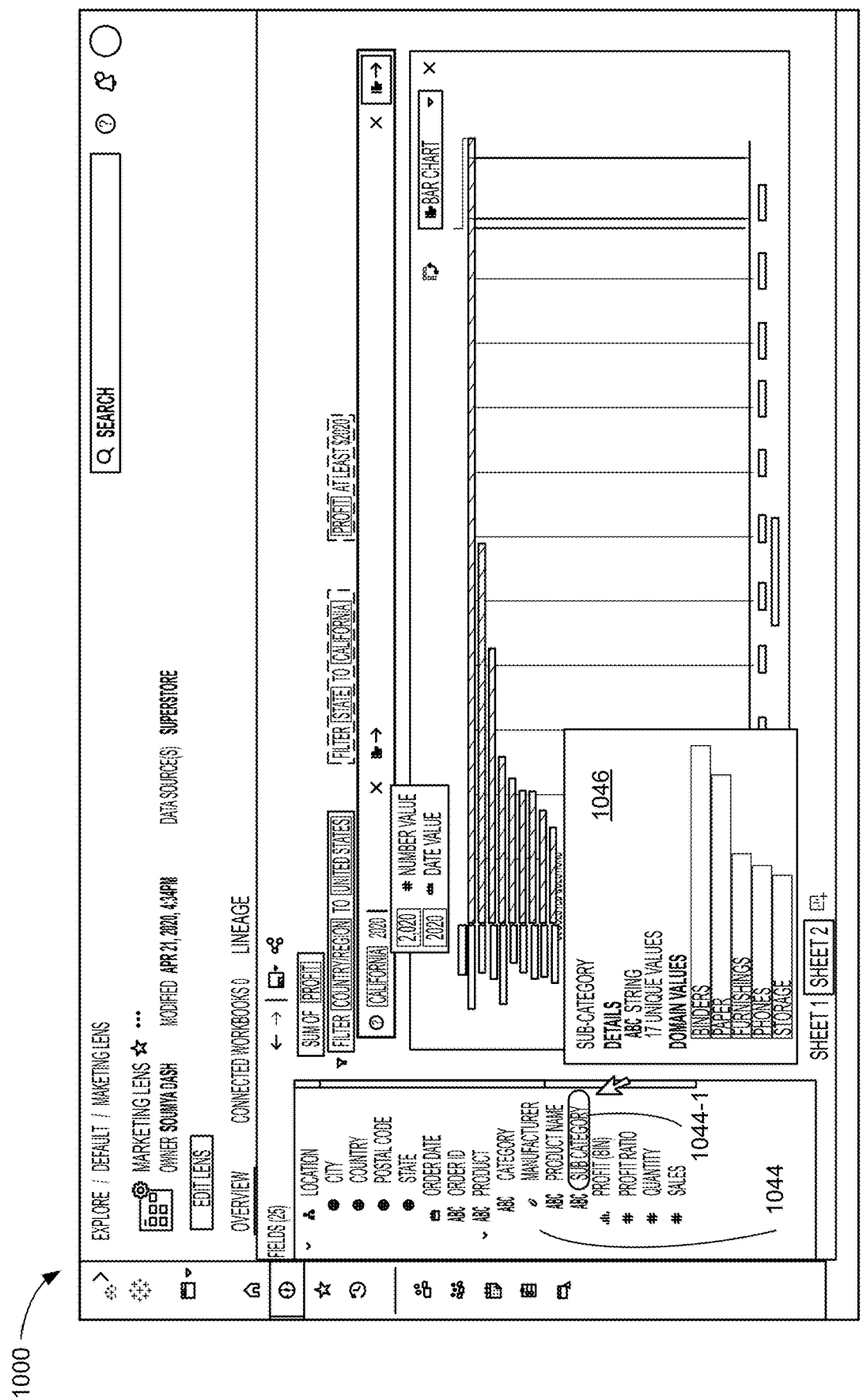

FIG. 9 also illustrates in some implementations, the computing system can add (922) a lens to the dashboard via user selection (910) of an existing lens (after choosing to "Pick an existing lens" 908). Under this approach, the user can elect to modify the lens (step 914), such as editing the data fields, synonyms, and/or questions corresponding to the lens, prior to causing the computing system to add the lens to the dashboard 1000. An example is provided in FIGS. 10M to 10U. FIG. 10M shows user selection (1042) of an affordance 1043 (e.g., an "Edit lens" affordance) to edit an existing lens (e.g., "Marketing Lens"). In some implementations, in response to the user selection, the computing system displays a list of fields 1044 corresponding to the lens, as illustrated in FIG. 10N.

Figure 10O:
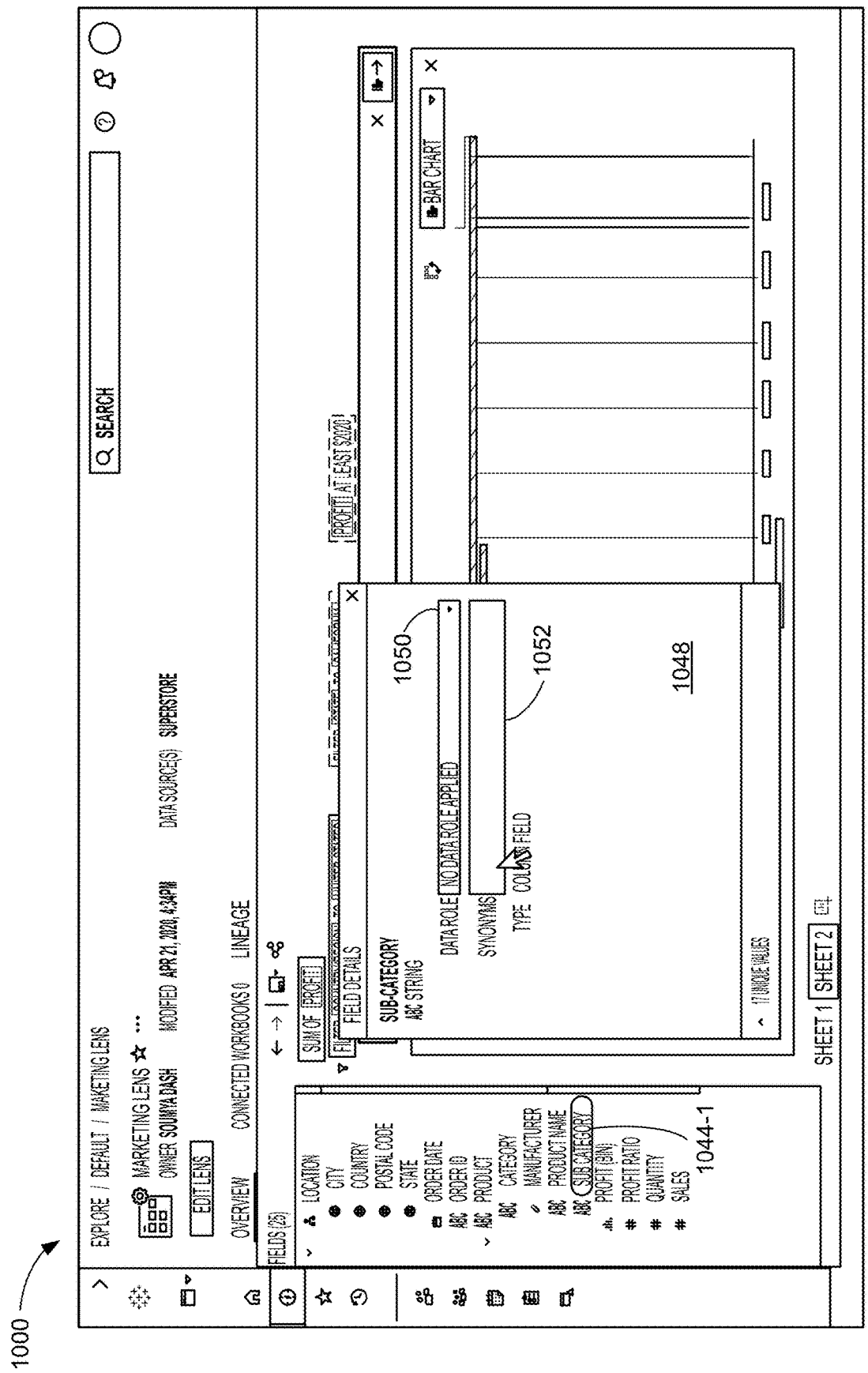
Figure 10P:
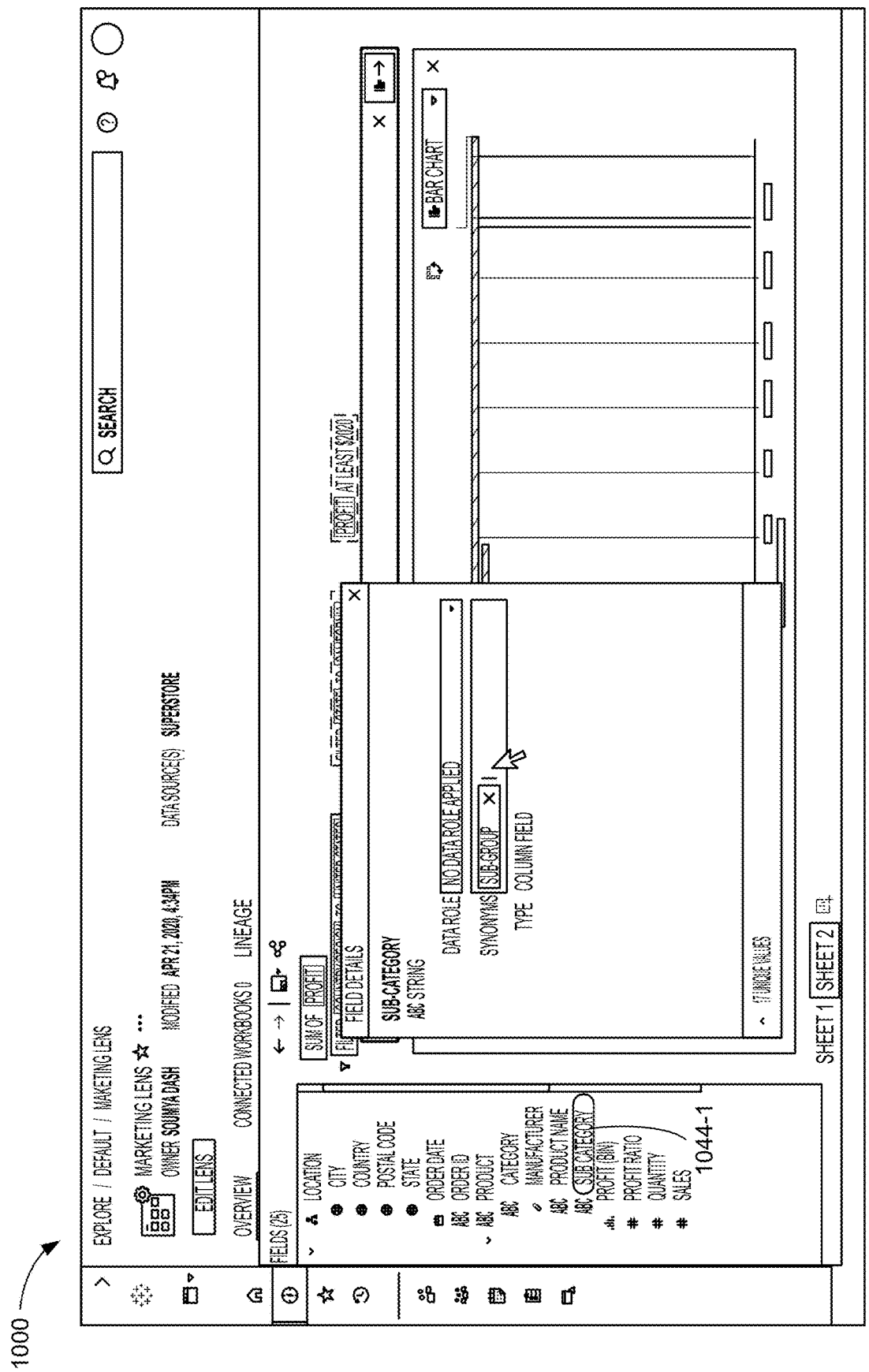
Figure 10Q:
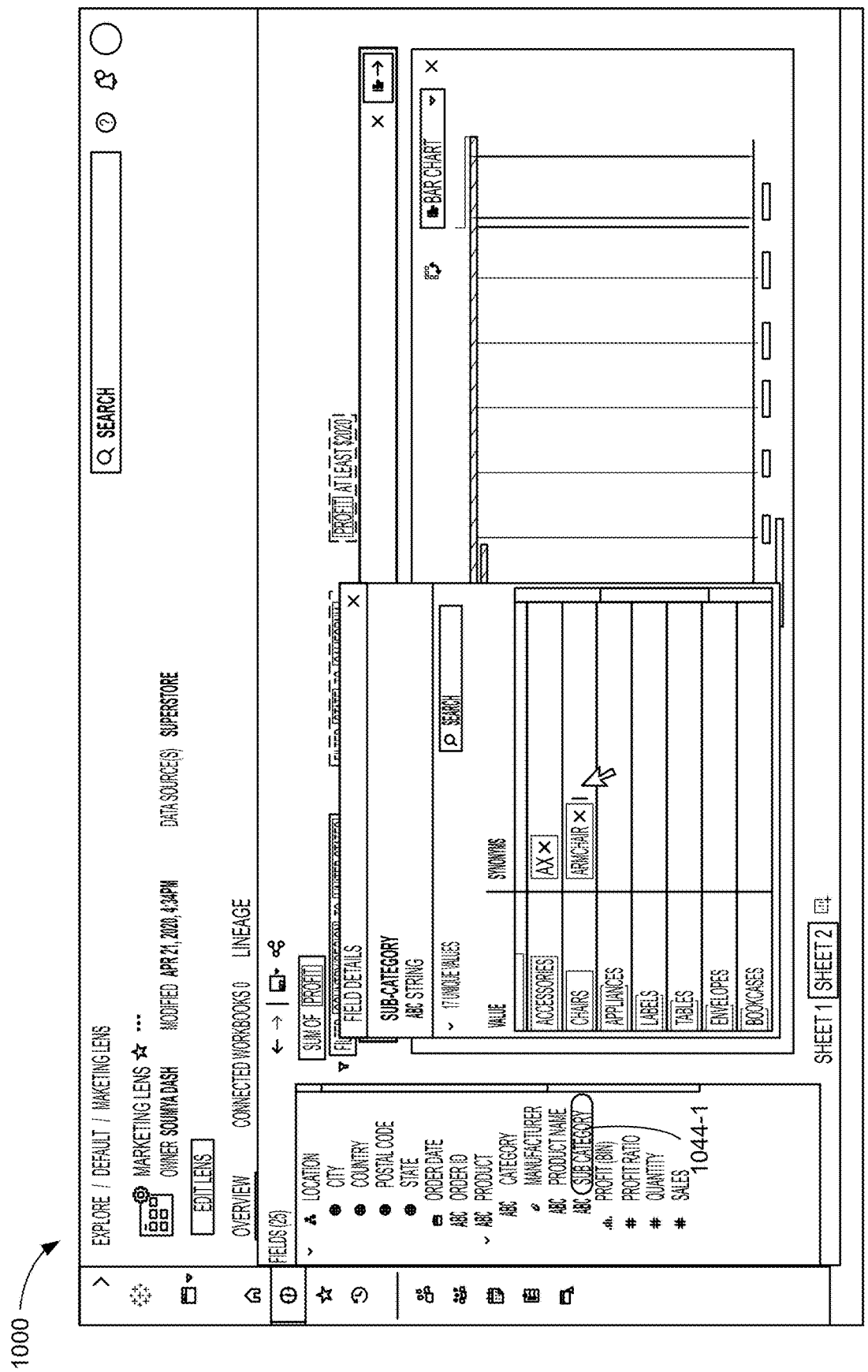
Figure 10R:
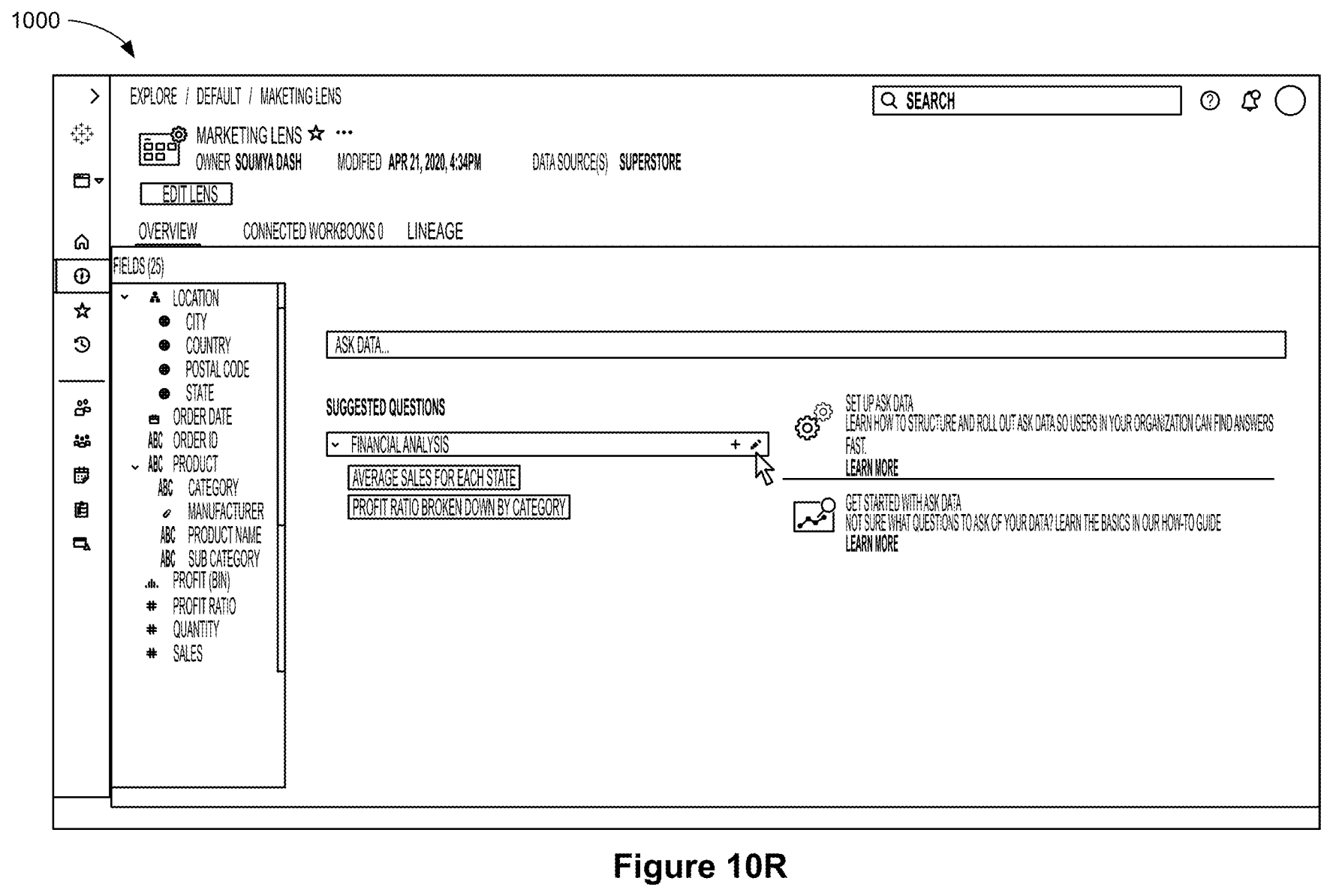
Figure 10S:
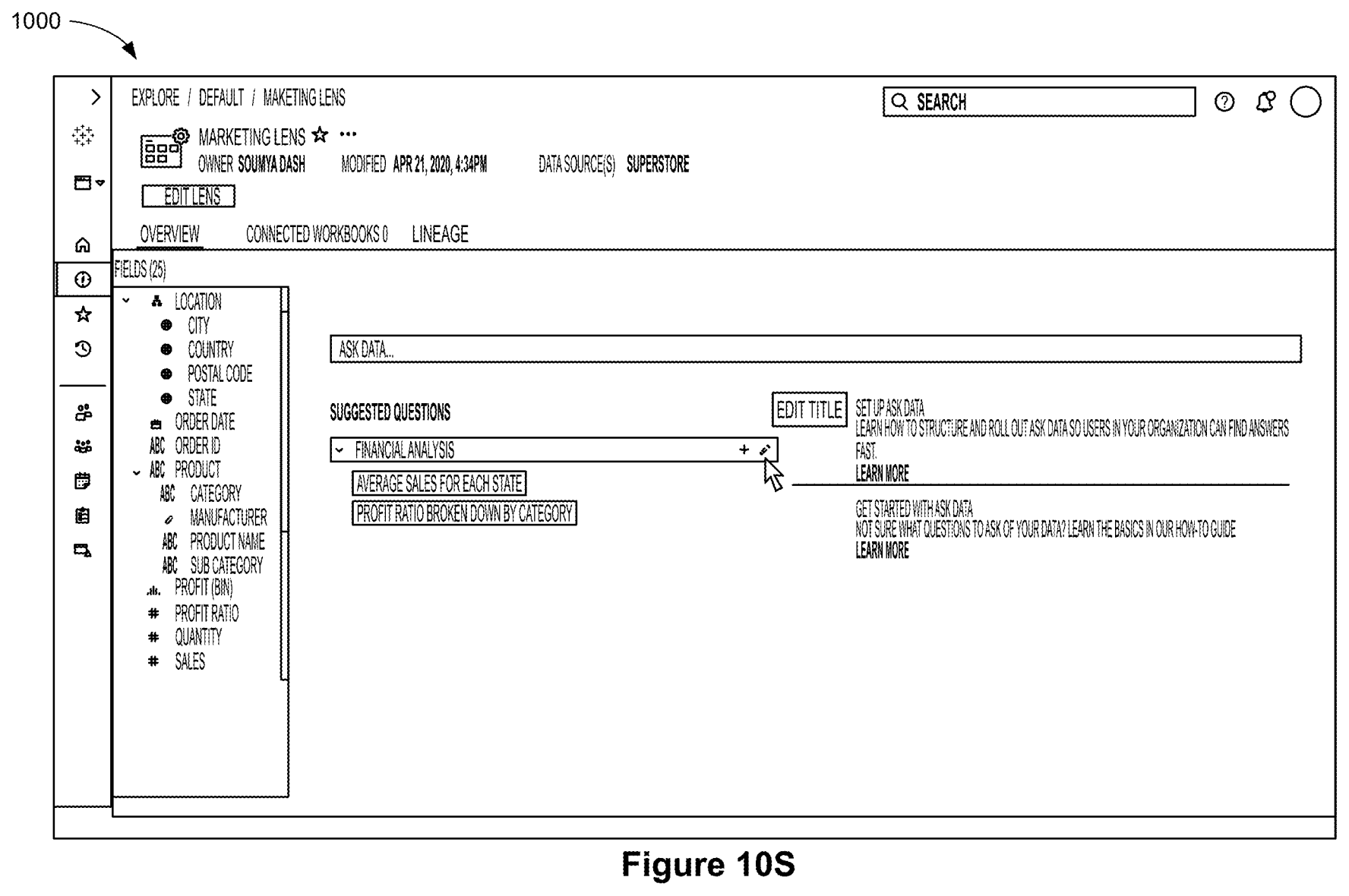
Figure 10T:
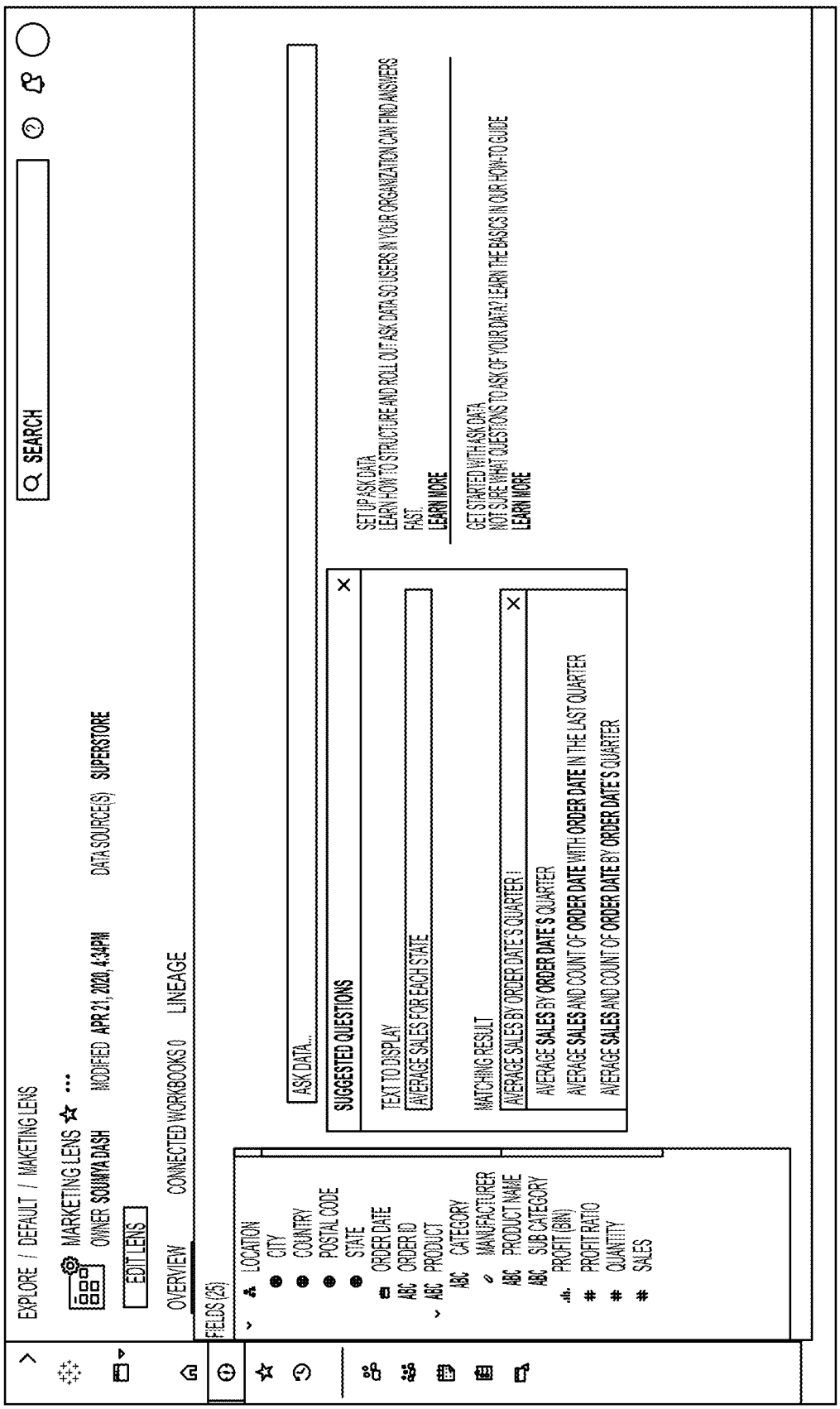
Figure 10U:
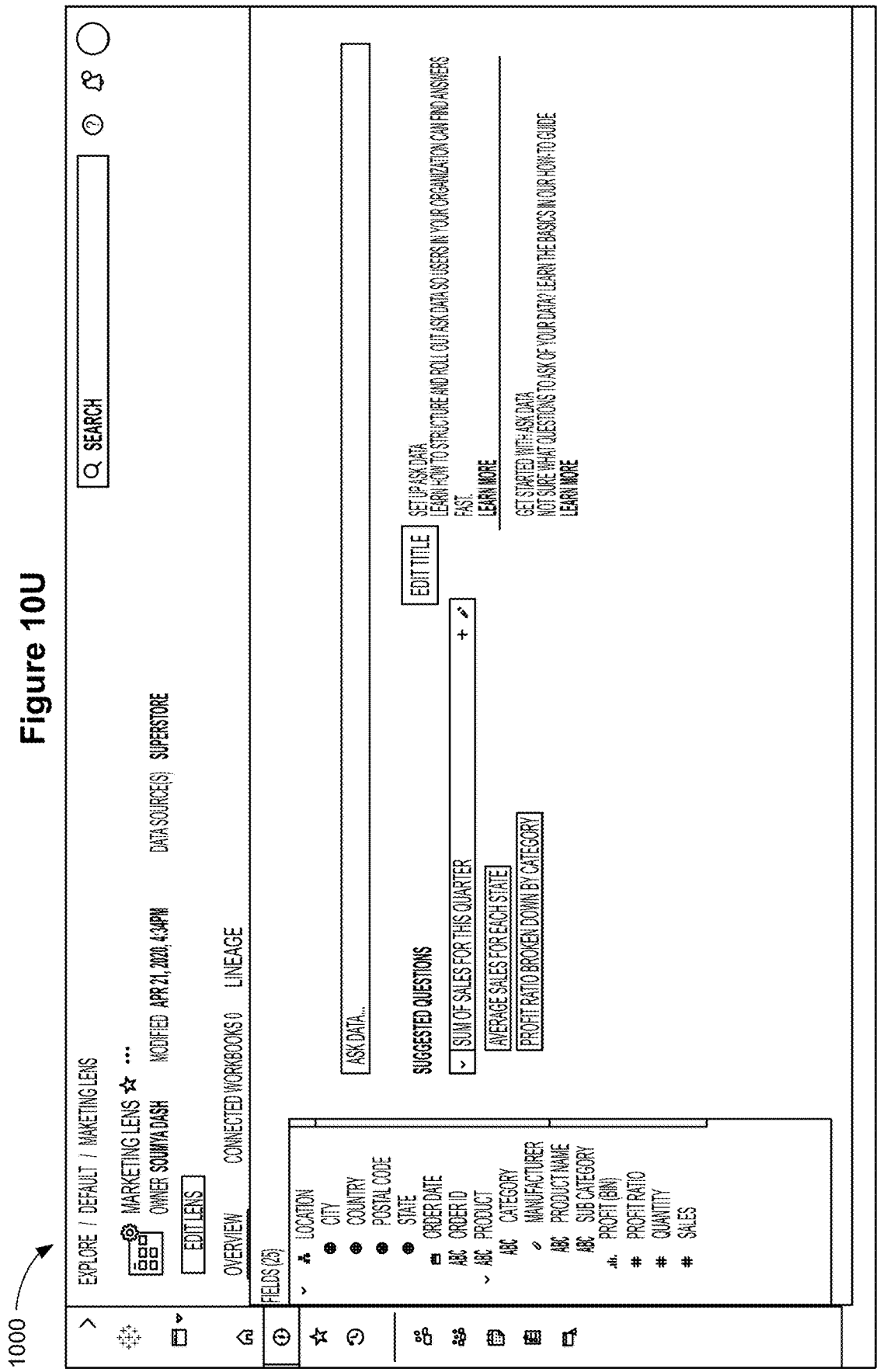
Figure 10V:
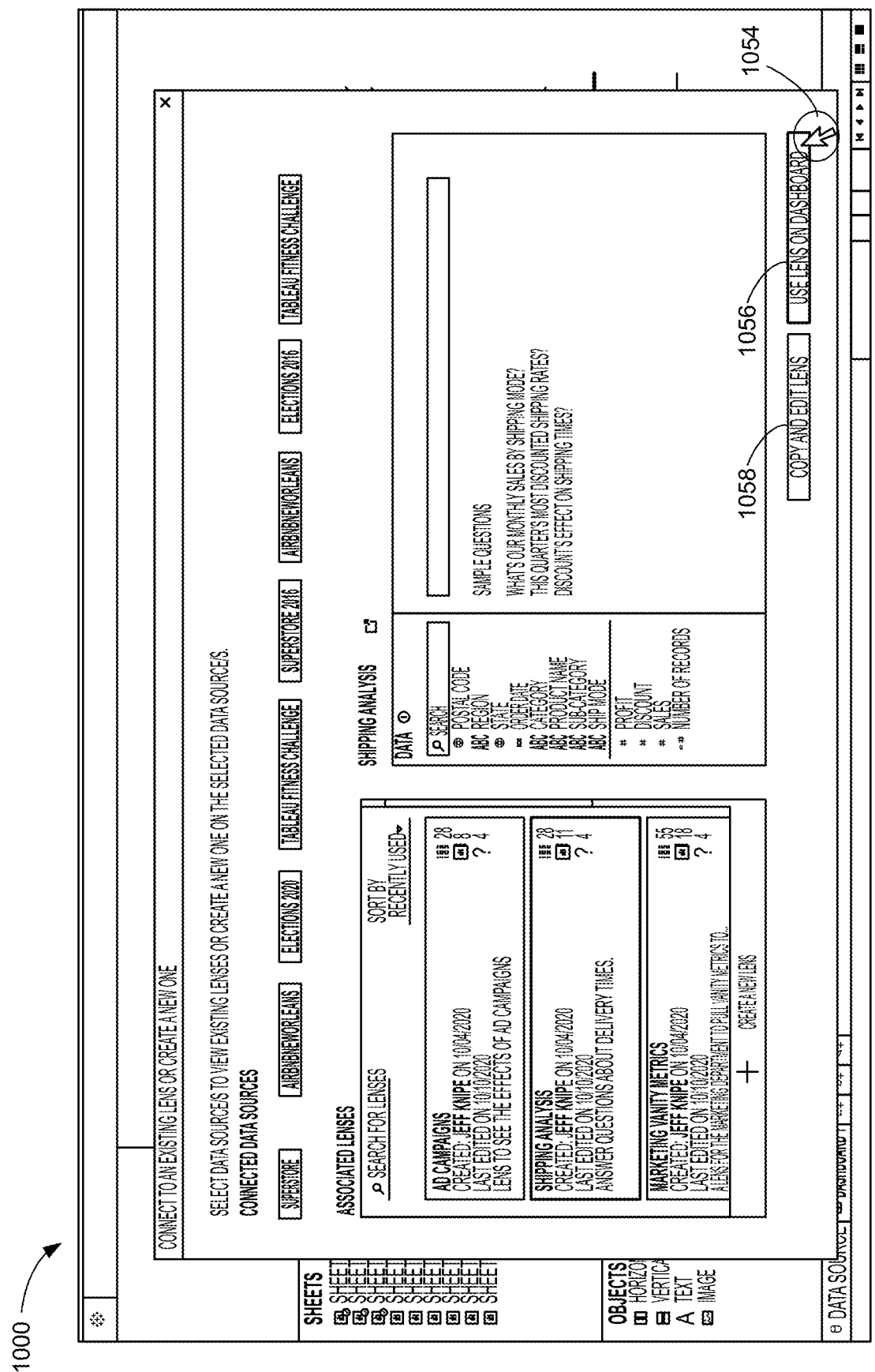

In response to user selection of the field 1044-1 (e.g., "Sub-Category") in the list of fields 1044, the computing system displays a window 1046, which includes details of the selected data field, such as the number of unique data values of the data field, data values of the data field, and/or a field type of the data field. In FIG. 10O, the user interacts with the data field 1044-1 (e.g., by double-clicking on the data field, or right-clicking on the data field). In response to the user interaction, the computing system displays a window 1048, which enables the user to specify metadata corresponding to the data field 1044-1, including defining a data role for the data field (e.g., by selecting an option using a dropdown menu 1050) and/or adding (1052) synonyms corresponding to the data field. FIG. 10P illustrates user specification of a data role and synonyms for the data field 1044-1. FIG. 10Q illustrates user specification of synonyms for some of the data values for the data field 1044-1. In this example, the user specifies a synonym "AX" for the data value "Accessories" and specifies a synonym "armchair" for the data value "Chairs." FIGS. 10R to 10U illustrate the user editing suggested questions for the lens.

With continued reference to FIG. 9, in some implementations, after receiving user specification of the lens and its corresponding metadata, the computing system receives a user input to add (922) the lens to the dashboard. FIG. 10V illustrates user selection (1054) of an affordance 1056 (e.g., "Use Lens on Dashboard"). In some implementations, in accordance with the user selection of the affordance 1056, the computing system adds the lens onto the dashboard. FIG. 10V also shows an affordance 1058 (e.g., "Copy and edit lens"). In some implementations, user selection of the affordance 1058 causes the computing system to duplicate a lens. The user (e.g., author) can edit the duplicated lens (e.g., using the steps 910, 914, and 922 outlined in FIG. 9 and illustrated in FIGS. 10M to 10U) for another business use case.

Figure 11A:
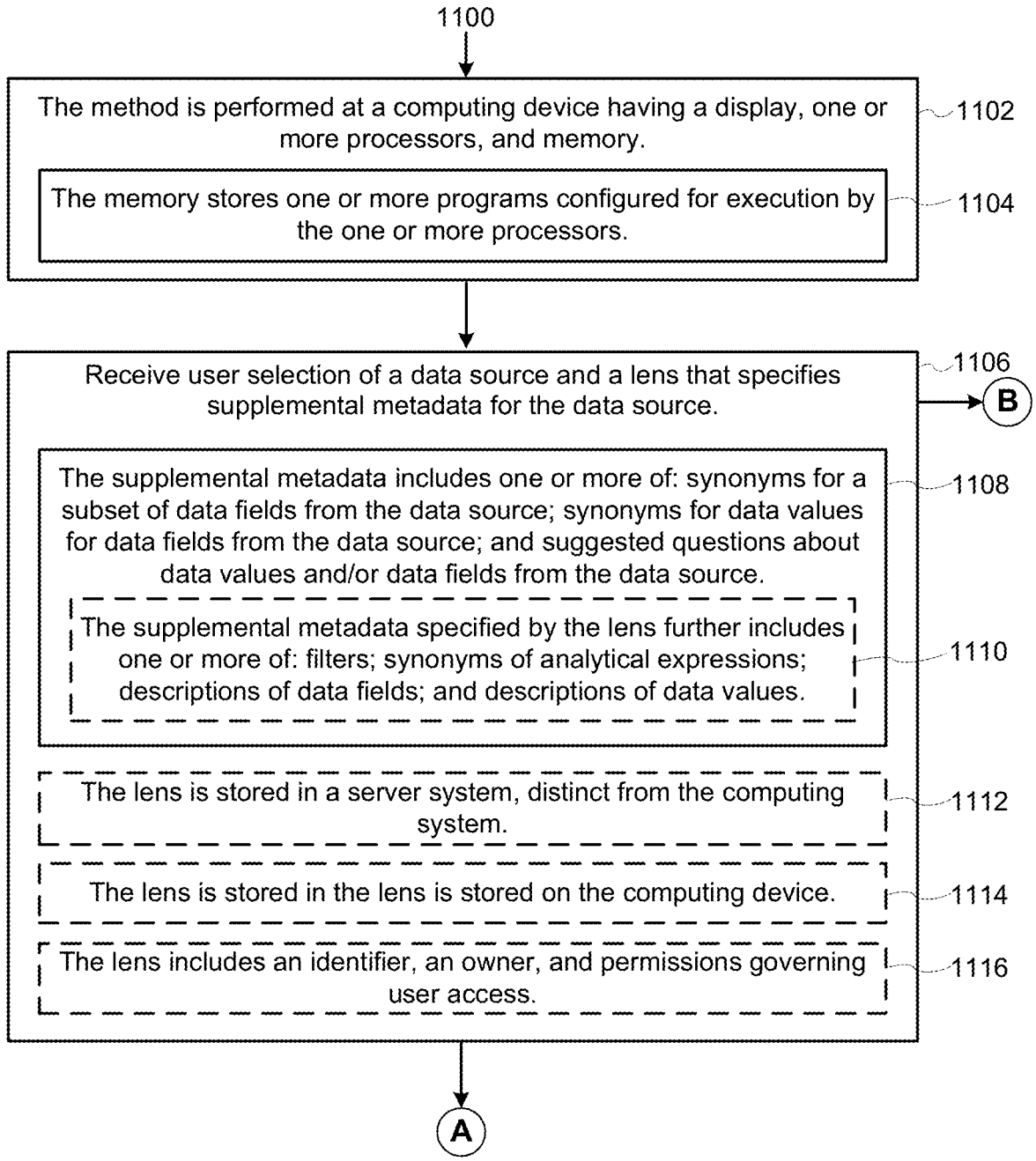
FIGS. 11A-11C provide a flowchart of a method performed at a computing device according to some implementations.
Figure 11B:
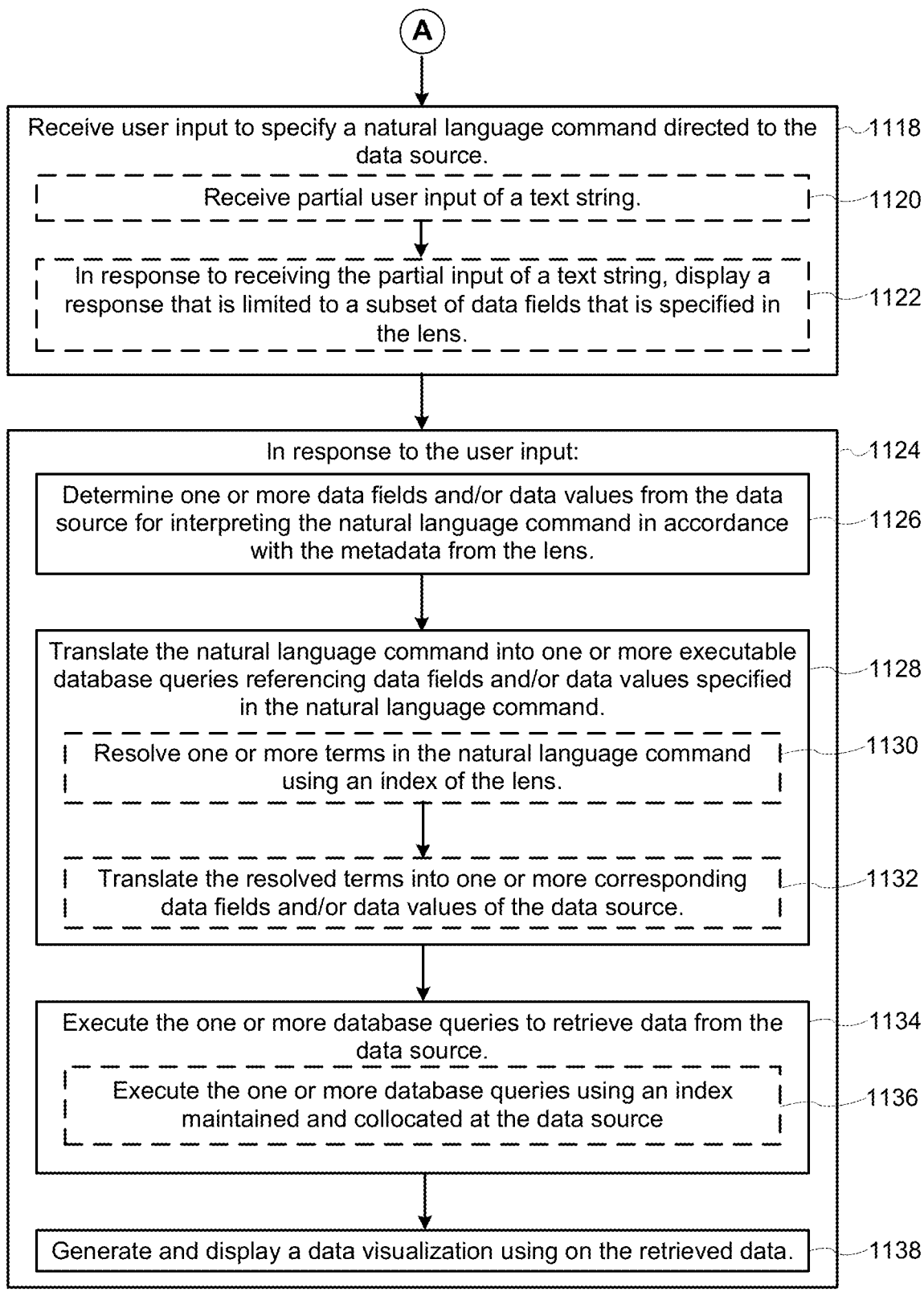
Figure 11C:
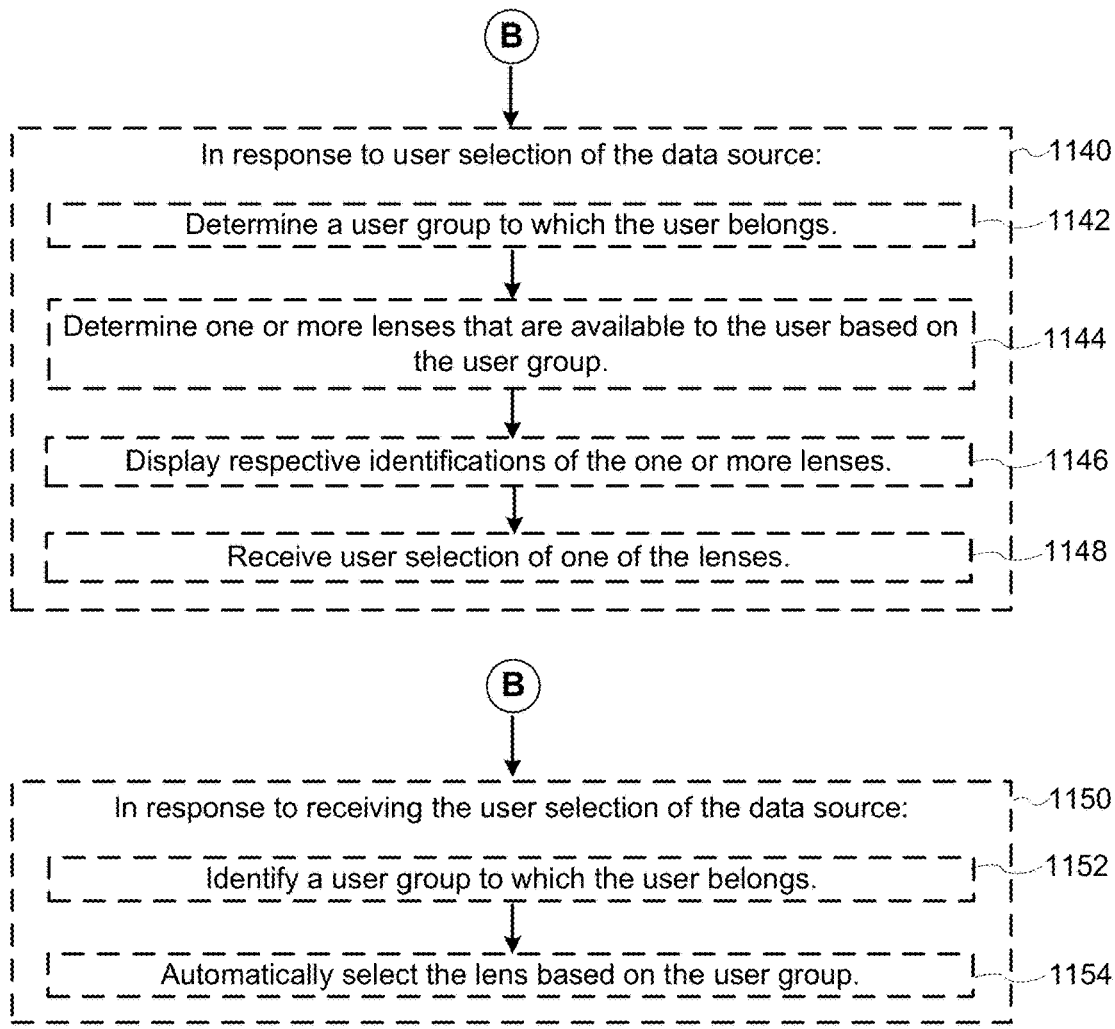

FIGS. 11A-11C provide a flowchart of a method 1100. The method 1100 is also called a process.

The method 1100 is performed (1102) at a computing device 200 that has a display 212, one or more processors 202, and memory 206. The memory 206 stores (1104) one or more programs configured for execution by the one or more processors 202. In some implementations, the operations shown in FIGS. 4 to 10V correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1100 may be combined and/or the order of some operations may be changed.

The computing device receives (1106) user selection of a data source 258 and a lens 265 that specifies supplemental metadata for the data source.

The supplemental metadata specified by the lens includes (1108) one or more of: synonyms for a subset of data fields from the data source, synonyms for data values of data fields from the data source, and suggested questions about data values and/or data fields from the data source. For example, in some implementations, the number of data fields in the subset is less than the total number of data fields of the data source. In some implementations, by including synonyms for data values of data fields in the lens, the total number of data values corresponding to the data fields in the lens can be larger than the total number of data values corresponding to the same data fields in the data source.

In some implementations, the supplemental metadata specified by the lens further includes (1110) one or more of: filters; synonyms of analytical expressions (e.g., synonyms for analytical expressions such as filters, groupings, or aggregations); descriptions of data fields; and descriptions of data values.

In some implementations, the lens is stored (1112) in a server system (e.g., server system 300), distinct from the computing system.

In some implementations, the lens is stored (1114) on the computing device 200. In some implementations, the lens is downloaded from the server system and stored locally onto the computing device.

In some implementations, the lens includes (1116) an identifier, an owner, and permissions governing user access.

The computing device receives (1118) user input to specify a natural language command directed to the data source.

In some instances, receiving the user input to specify the natural language command includes receiving (1120) partial user input of a text string. In response to receiving the partial input of a text string, the computing device displays (1122) a response that is limited to a subset of data fields that is specified in the lens. For example, in some implementations, the lens effectively acts as a filter of available fields in the data source.

In some implementations, in response (1124) to the user input, the computing device determines (1126) (e.g., identifies) one or more data fields and/or data values from the data source for interpreting the natural language command in accordance with the metadata from the lens.

The computing device 200 translates (1128) the natural language command into one or more executable database queries referencing data fields and/or data values specified in the natural language command.

In some implementations, translating the natural language command into one or more executable database queries further comprises: resolving (1130) one or more terms in the natural language command using an index of the lens (e.g., to identify one or more synonyms of data fields and/or data values); and translating (1132) the resolved terms into one or more corresponding data fields and/or data values of the data source. For example, in some implementations, only the values pertaining to the use case of the lens, as specified in the metadata of the lens, will be used for interpreting queries for that lens.

The computing device 200 executes (1134) the one or more database queries to retrieve data from the data source.

In some implementations, the computing device executes (1136) the one or more database queries using an index maintained and collocated at the data source (e.g., an elastic value index 412 and/or an elastic concept index 414).

The computing device 200 generates (1138) and displays a data visualization using the retrieved data.

In some implementations, a lens is sometimes referred to as a curated "artifact." An artifact refers to a piece of content that is managed by a server system (e.g., the server system 300) and searchable in the computing device 200. The lens is separate from the data source but uses the data source to connect to data, as illustrated in FIG. 5B. The underlying source of truth (e.g., the published data source) remains the same. The lens uses a subset of fields that is curated without affecting the data source of the other lenses.

In some implementations, the computing device processes (e.g., interprets) the natural language command according to the combination of metadata from the data source and the lens. In some implementations, the metadata of the lens determines the fields and value indexes (which exist at the data source level) that should be used to interpret the query.

As an example, a first data source may have two data fields "Race" and "Ethnicity". A first lens of the first data source may expose both fields with no synonyms on either. A second lens of the first data source may expose the "Race" field, with a synonym "Ethnicity" for the "race" data field. As a result, a query like "count of Employees by ethnicity" would resolve to "count of Employees by Race" in the second lens.

As another example, a data field "Location" in a data source may have a value "San Francisco Bay Area." A lens that includes the "Location" data field may have a synonym for "SF" for the data value "San Francisco Bay Area." Accordingly, a natural language command "Show me March sales in SF" will resolve to "Sum of sales for the month of March" with location filtered to "San Francisco Bay Area."

In some implementations, after retrieving data from the data source, the computing device translates the retrieved data into the synonyms specified in the lens. The computing device also includes (e.g., displays) the synonyms in the generated data visualization. In some implementations, the computing device generates one or more executable database queries in such a way that the retrieved data generate the correct column names (e.g., use the synonyms specified in the lens).

With continued reference to FIG. 11C, in some implementations, receiving (1106) user selection of the data source and the lens further comprises: in response (1140) to the user selection of the data source, the computing device determines (1142) a user group to which the user belongs. The computing device determines (1144) one or more lenses that are available to the user based on the user group. The computing device displays (1146) respective identifications of the one or more lenses. The computing device receives (1148) user selection of one of the lenses.

In some implementations, receiving (1106) user selection of the data source and the lens further comprises: in response (1150) to the user selection of the data source: the computing device identifies (1152) a user group to which the user belongs. The computing device automatically selects (1154) the lens based on the user group.

Figure 12:
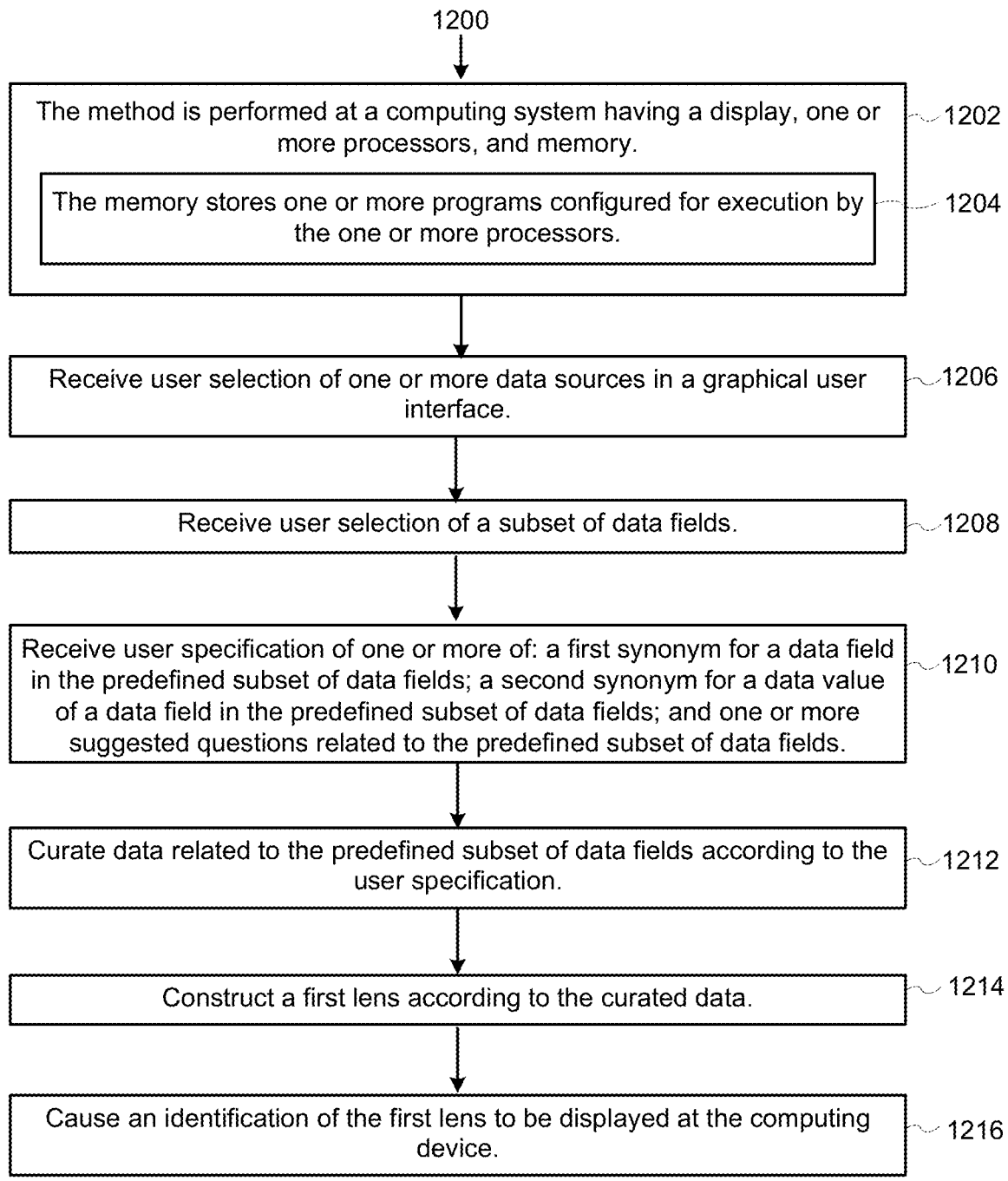
FIG. 12 provides a flowchart of a method performed at a computing device according to some implementations.

FIG. 12 provides a flowchart of a method 1200 for generating lenses for visual analysis. The method 1200 is also called a process.

The method 1200 is performed (1202) at a computing system (e.g., computing device 200) that has a display, one or more processors, and memory. The memory stores (1204) one or more programs configured for execution by the one or more processors. In some implementations, the operations shown in FIGS. 4 to 10V correspond to instructions stored in the memory or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1200 may be combined and/or the order of some operations may be changed.

The computing system receives (1206) user selection of one or more data sources in a graphical user interface (e.g., the graphical user interface 100 or the dashboard 1000).

The computing system receives (1208) user selection of a subset of data fields.

The computing system receives (1210) user specification of one or more of: a first synonym for a data field in the subset of data fields; a second synonym for a data value of a data field in the subset of data fields; and one or more suggested questions related to the subset of data fields.

The computing system curates (1212) data related to the subset of data fields according to the user specification.

The computing system constructs (1214) a first lens according to the curated data.

In some implementations, constructing the first lens further comprises generating a first lens index according to the curated data for the subset of data fields (e.g., the first lens index is specific to the first lens).

The computing system causes (1216) an identification of the first lens to be displayed at the computing device.

In some implementations, the computing system also causes one or more suggested questions to be displayed on the graphical user interface together with the identification of the first lens.

In some implementations, the computing system constructs the first lens using an object model of the one or more data sources.

In some implementations, prior to the user selection of the one or more data sources, the computing system receives a user input initiating creation of the first lens. For example, as illustrated in FIG. 10A, a user (e.g., an author or curator of the first lens) can initiate creation of a lens by selecting a dashboard object (e.g., dashboard object 1004-1) and dragging the dashboard object onto a data visualization region of the graphical user interface.

In some implementations, curating data related to the subset of data fields comprises adding metadata to the predefined subset of data fields in accordance with the user specification.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having a display, one or more processors, and memory storing one or more programs configured for execution by the one or more processors:
receiving, from a user, a first user selection of a data source having a plurality of stored lenses, each lens of the plurality of stored lenses comprising a respective set of curated supplemental metadata corresponding to a respective subset of data fields from the data source, wherein:
the respective set of curated supplemental metadata supplements metadata of data fields from the data source included in a semantic model of the data source;
the plurality of stored lenses are distinct from the semantic model of the data source; and
the respective set of curated supplemental metadata specifies two or more of:
synonyms for at least some data fields in the respective subset of data fields from the data source;
synonyms for data values for at least some data fields in the respective subset of data fields from the data source; and
suggested questions for at least some of the data values or at least some of the data fields in the respective subset of data fields from the data source;
receiving a second user selection of a first lens of the plurality of stored lenses;
receiving user input to specify a natural language command directed to the data source;
in response to receiving the user input:
determining one or more data fields or data values from the data source for interpreting the natural language command;
applying a first index of the first lens to resolve one or more terms in the natural language command, including determining synonyms for the one or more data fields or data values;
translating the resolved one or more terms into one or more database queries referencing the one or more data fields or data values;
executing the one or more database queries to retrieve data from the data source; and
generating and displaying a data visualization in accordance with the retrieved data.

2. The method of claim 1, wherein the one or more database queries are executed by looking up the one or more database queries in a second index maintained and collocated at the data source.

3. The method of claim 1, wherein the first lens further specifies one or more of:
filters;
synonyms of analytical expressions;
descriptions of a first set of data fields; and
descriptions of a first set of data values.

4. The method of claim 1, wherein receiving the user input to specify the natural language command includes receiving partial user input of a text string, the method further comprising:
in response to receiving the partial user input of the text string, displaying a response that is limited to the respective subset of data fields that is specified in the lens.

5. The method of claim 1, wherein the plurality of stored lenses are stored in a server system, distinct from the computing device.

6. The method of claim 1, wherein the plurality of stored lenses are stored on the computing device.

7. The method of claim 1, wherein each lens of the plurality of stored lenses includes an identifier, an owner, and permissions governing user access.

8. The method of claim 1, wherein the first user selection of the data source and the second user selection of the first lens comprises:
in response to receiving the first user selection of the data source:
determining a user group to which the user belongs;
determining one or more lenses that are available to the user based on the user group;
displaying respective identifications of the one or more lenses; and
receiving user selection of the first lens from the one of the lenses.

9. The method of claim 1, wherein in response to receiving the first user selection of the data source:
identifying a user group to which the user belongs; and
automatically selecting the first lens based on the user group.

10. A computing device, comprising:
a display;
one or more processors; and
memory coupled to the one or more processors, the memory storing one or more programs configured to be executed by the one or more processors, the one or more programs including instructions for:
receiving, from a user, a first user selection of a data source having a plurality of stored lenses, each lens of the plurality of stored lenses comprising a respective set of curated supplemental metadata corresponding to a respective subset of data fields from the data source, wherein:
the respective set of curated supplemental metadata supplements metadata of data fields from the data source included in a semantic model of the data source;
the plurality of stored lenses are distinct from the semantic model of the data source; and
the respective set of curated supplemental metadata specifies two or more of:
synonyms for at least some data fields in the respective subset of data fields from the data source;
synonyms for data values for at least some data fields in the respective subset of data fields from the data source; and
suggested questions for at least some of the data values or at least some of the data fields in the respective subset of data fields from the data source;
receiving a second user selection of a first lens of the plurality of stored lenses;
receiving user input to specify a natural language command directed to the data source;
in response to receiving the user input:
determining one or more data fields or data values from the data source for interpreting the natural language command;
applying a first index of the first lens to resolve one or more terms in the natural language command, including determining synonyms for the one or more data fields or data values;
translating the resolved one or more terms into one or more database queries referencing the one or more data fields or data values;
executing the one or more database queries to retrieve data from the data source; and
generating and displaying a data visualization in accordance with the retrieved data.

11. The computing device of claim 10, wherein the one or more database queries are executed by looking up the one or more database queries in a second index maintained and collocated at the data source.

12. The computing device of claim 10, wherein the first lens further specifies one or more of:
filters;
synonyms of analytical expressions;
descriptions of a first set of data fields; and
descriptions of a first set of data values.

13. The computing device of claim 10, wherein the instructions for receiving the user input to specify the natural language command include instructions for receiving partial user input of a text string, the one or more programs further including instructions for:
in response to receiving the partial user input of the text string, displaying a response that is limited to the respective subset of data fields that is specified in the lens.

14. A non-transitory computer-readable storage medium storing one or more programs, the one or more programs comprising instructions, which when executed by a computing device, cause the computing device to perform operations comprising:
receiving, from a user, a first user selection of a data source having a plurality of stored lenses, each lens of the plurality of stored lenses comprising a respective set of curated supplemental metadata corresponding to a respective subset of data fields from the data source, wherein:
the respective set of curated supplemental metadata supplements metadata of data fields from the data source included in a semantic model of the data source;
the plurality of stored lenses are distinct from the semantic model of the data source; and
the respective set of curated supplemental metadata specifies two or more of:
synonyms for at least some data fields in the respective subset of data fields from the data source;
synonyms for data values for at least some data fields in the respective subset of data fields from the data source; and suggested questions for at least some of the data values or at least some of the data fields in the respective subset of data fields from the data source;

receiving a second user selection of a first lens of the plurality of stored lenses;

receiving user input to specify a natural language command directed to the data source;

in response to receiving the user input:

determining one or more data fields or data values from the data source for interpreting the natural language command;

applying a first index of the first lens to resolve one or more terms in the natural language command, including determining synonyms for the one or more data fields or data values;

translating the resolved one or more terms into one or more database queries referencing the one or more data fields or data values;

executing the one or more database queries to retrieve data from the data source; and generating and displaying a data visualization in accordance with the retrieved data.

15. The non-transitory computer-readable storage medium of claim 14, wherein the plurality of stored lenses are stored on the computing device.

16. The non-transitory computer-readable storage medium of claim 14, wherein each lens of the plurality of stored lenses includes an identifier, an owner, and permissions governing user access.

17. The non-transitory computer-readable storage medium of claim 14, wherein the first user selection of the data source and the second user selection of the first lens comprises:

in response to receiving the first user selection of the data source:

determining a user group to which the user belongs;

determining one or more lenses that are available to the user based on the user group;

displaying respective identifications of the one or more lenses; and receiving user selection of the first lens from the one of the lenses.

18. The non-transitory computer-readable storage medium of claim 14, wherein in response to receiving the first user selection of the data source:

identifying a user group to which the user belongs; and automatically selecting the first lens based on the user group.

* * * * *